US006817853B2

(12) United States Patent
Simonds et al.

(10) Patent No.: US 6,817,853 B2
(45) Date of Patent: Nov. 16, 2004

(54) MOLDING PROCESSES AND EQUIPMENT FOR FORMING GOLF BALLS WITH DEEP DIMPLES

(75) Inventors: Vincent J. Simonds, Brimfield, MA (US); Kevin J. Shannon, Springfield, MA (US); Thomas A. Veilleux, Charlton, MA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 10/305,680

(22) Filed: Nov. 27, 2002

(65) Prior Publication Data

US 2003/0153402 A1 Aug. 14, 2003

Related U.S. Application Data

(60) Provisional application No. 60/422,423, filed on Oct. 30, 2002, provisional application No. 60/356,400, filed on Feb. 11, 2002, and provisional application No. 60/337,123, filed on Dec. 4, 2001.

(51) Int. Cl.[7] .......................... B29C 45/14; B29C 70/70
(52) U.S. Cl. ..................... 425/116; 425/125; 425/577
(58) Field of Search .............................. 425/116, 120, 425/125, 418, 577

(56) References Cited

U.S. PATENT DOCUMENTS

| | | | | |
|---|---|---|---|---|
| 3,177,280 A | * | 4/1965 | Ford et al. .................. 264/275 |
| 5,147,657 A | * | 9/1992 | Giza .......................... 425/117 |
| 5,192,079 A | * | 3/1993 | Sun et al. ................... 473/384 |
| 5,470,076 A |   | 11/1995 | Cadorniga ................... 473/384 |
| 5,782,702 A |   | 7/1998 | Yamagishi et al. ......... 473/384 |
| 5,782,703 A |   | 7/1998 | Yamagishi et al. ......... 473/280 |
| 5,836,834 A | * | 11/1998 | Masutani et al. ........... 473/374 |
| 5,882,567 A | * | 3/1999 | Cavallaro et al. ........... 264/255 |
| 5,947,844 A |   | 9/1999 | Shimosaka et al. ......... 473/379 |
| 6,033,611 A | * | 3/2000 | Yamaguchi ................. 264/250 |
| 6,066,055 A | * | 5/2000 | Nishino ...................... 473/384 |
| 6,229,550 B1 |   | 5/2001 | Gloudemans et al. |
| 6,290,614 B1 |   | 9/2001 | Kennedy, III et al. ...... 473/378 |
| 6,302,808 B1 |   | 10/2001 | Dalton et al. ............... 473/371 |
| 6,319,451 B1 | * | 11/2001 | Brune ........................ 264/278 |
| 6,368,238 B1 |   | 4/2002 | Kasashima et al. ......... 473/383 |
| 6,379,138 B1 | * | 4/2002 | Puniello et al. ............. 425/116 |
| 6,659,886 B1 |   | 12/2003 | Yamagishi et al. |
| 2002/0016435 A1 |   | 2/2002 | Simonutti et al. .......... 264/279 |
| 2002/0037335 A1 |   | 3/2002 | Ogg et al. .................. 425/116 |

FOREIGN PATENT DOCUMENTS

| | | | | |
|---|---|---|---|---|
| JP | 11089967 A | * | 4/1999 | .......... A63B/37/00 |
| JP | 11290482 A | * | 10/1999 | .......... A63B/45/00 |
| JP | 2000271250 A | * | 10/2000 | .......... A63B/45/00 |

* cited by examiner

*Primary Examiner*—Robert B. Davis

(57) ABSTRACT

Molding equipment and related techniques for forming a golf ball are disclosed. The golf ball comprises a core and a cover layer, wherein the cover layer provides one or more deep dimples that extend through the cover layer to and/or into a layer or component underneath are disclosed. The molding equipment provides one or more selectively positionable knock-out pins along the surface of the molding chamber. These pins are specially tailored such that after their retraction subsequent to molding, the resulting voids are deep dimples. The molding equipment and related processes are particularly useful when forming the various layers by reaction injection molding.

16 Claims, 21 Drawing Sheets

MOLDING PROCESSES AND EQUIPMENT FOR FORMING GOLF BALLS WITH DEEP DIMPLES

CROSS REFERENCES TO RELATED APPLICATIONS

The present application claims priority upon U.S. Provisional Application Ser. No. 60/337,123, filed Dec. 4, 2001; U.S. Provisional Application Ser. No. 60/356,400, filed Feb. 11, 2002; and U.S. Provisional Application Ser. No. 60/422,423, filed Oct. 30, 2002.

FIELD OF THE INVENTION

The present invention relates to processes and apparatuses for forming golf balls, and more particularly to processes and equipment for forming golf balls having one or more deep dimples that extend through a cover layer to and/or into one or more layers or components thereunder. The present invention also relates to processes and apparatuses for forming golf balls with deep dimples by utilizing one or more specifically tailored "knock-out" pins that serve to support the core or ball assembly during molding, assist in removing the molded ball from the mold, and form deep dimples in the ball. These particularly tailored pins are preferably used in conjunction with other features in the mold to form deep dimples in the resulting ball. The various processes and apparatuses described herein are particularly well suited for use in conjunction with reaction injection molding techniques.

BACKGROUND OF THE INVENTION

A number of two-piece (a solid resilient center or core with a molded cover) and multi-layer (liquid or solid center and multiple mantle and/or cover layers) golf balls have been produced. Different types of materials and/or processing parameters have been utilized to formulate the cores, covers, etc. of these balls, which dramatically alter the balls' overall characteristics. In addition, multi-layer covers of different materials have also been formulated in an attempt to produce a golf ball having the overall distance, playability and durability characteristics desired.

For certain applications it is desirable to produce a golf ball having a very thin cover layer. However, due to equipment limitations, it is often very difficult to mold a thin cover. Accordingly, it would be beneficial to provide an apparatus and technique for producing a relatively thin outer cover layer.

Moreover, retractable pins have been utilized to hold, or center, the core or core and mantle and/or cover layer(s) in place while molding an outer cover layer thereon. However, these pins have only been utilized to support the core during molding and have not contributed to the outer appearance of the ball. In fact, conventional pins sometimes produce centering difficulties and cosmetic problems (i.e. pin flash, pin marks, etc.) during retraction, which in turn require additional handling to produce a golf ball suitable for use and sale. Accordingly, it would be desirable to provide an apparatus and method for forming a cover layer on a golf ball with retractable pins that overcame the problems associated with conventional pins.

SUMMARY OF THE INVENTION

One aspect of the present invention is to provide equipment and methods for forming a golf ball with a thin cover that has a favorable combination of playability properties yet which may be manufactured more cost effectively and without many of the problems associated with prior balls.

Yet another aspect of the invention is to provide equipment and methods for forming a golf ball having one or more deep dimples and a resulting favorable combination of spin, resiliency and durability characteristics.

A further aspect of the invention is to provide equipment and methods for forming a golf ball having a dimpled cover that is thinner than traditional cover layers with one or more deep dimples.

Another aspect of the invention is to provide equipment and methods for forming a golf ball having dimples in an outer cover layer that extend to, and/or into at least the next inner layer of the ball.

Yet another aspect of the invention is to provide equipment and methods for forming a golf ball core or intermediate ball assembly that in many instances may be readily removed from a molding assembly.

Another aspect of the invention is to provide novel molding equipment that simplifies manufacturing of golf balls and components thereof. The equipment utilizes one or more specifically tailored "knock-out" pins that serve to support the core or ball during molding, assist in removing the molded ball from the mold, and form deep dimples in the ball. These particularly tailored pins are preferably used in conjunction with other features in the mold to form deep dimples in the resulting ball.

In a further aspect, the present invention provides a molding apparatus adapted for forming a golf ball having one or more deep dimples. The apparatus comprises an upper mold having a first hemispherical molding surface that defines a hemispherical molding cavity, and at least one aperture defined along the first molding surface. The upper mold further has, in each of the apertures, a selectively positionable pin having a distal end that may be extended into the cavity or retracted from the cavity. The molding apparatus further comprises a lower mold having a second hemispherical molding surface that defines a hemispherical molding cavity and at least one aperture defined along the second molding surface. The lower mold further has, in each of the apertures, a selectively positionable pin having a distal end that may be extended into the cavity or retracted therefrom. The upper mold and the lower mold are adapted to engage each other such that the first molding surface and the second molding surface form a generally spherical molding chamber. The pins in each of the apertures defined in the upper mold and lower mold extend into the molding chamber a distance of from about 0.002 inches to about 0.140 inches as measured from the respective first or second molding surface. The pins remain in the extended position during a molding operation so as to form a corresponding number of deep dimples in the resulting golf ball.

In another aspect, the present invention provides a molding apparatus adapted to form a golf ball with a plurality of deep dimples along an outer surface of the ball. The apparatus comprises a first mold including a first hemispherical molding surface defining a first molding cavity and at least one aperture defined along the first molding surface. The first molding surface has at least one raised protuberance adapted to form a deep dimple. The first mold further includes, in each of the apertures, a selectively positionable pin having a distal end that may be extended into the first cavity or retracted from the first cavity. The molding apparatus further includes a second mold having a second hemispherical molding surface that defines a second molding cavity and at least one aperture defined along the second molding surface. The second molding surface has at least one raised protuberance adapted to form a deep dimple. The second mold further includes, in each of the apertures, a selectively positionable pin having a distal end that may be extended into the second cavity or retracted from the second cavity. The first mold and the second mold are adapted to engage each other such that the first molding surface and the second molding surface form a generally spherical molding chamber. At least a portion of the raised protuberances in the first and second molding surfaces have a height, as measured from their respective molding surface, of from about 0.002 inches to about 0.140 inches.

In yet another aspect, the present invention provides a molding apparatus adapted for forming a golf ball with a plurality of deep dimples along an outer surface of the golf ball. The apparatus comprises a first mold including a first hemispherical molding surface defining a first molding cavity and at least one aperture defined along the first molding surface. The first molding surface has at least one raised protuberance adapted to form a deep dimple. The first mold further includes, in each of the apertures, a selectively positionable pin having a distal end that may be extended into the first cavity or retracted from the first cavity. Each of the pins associated with the first mold are positionable such that the distal end extends into the first molding chamber a distance of from about 0.002 inches to about 0.140 inches as measured from the first molding surface. The molding apparatus further comprises a second mold including a second hemispherical molding surface defining a second molding cavity and at least one aperture defined along the second molding surface. The second molding surface has at least one raised protuberance adapted to form a deep dimple. The second mold further includes, in each of the apertures, a selectively positionable pin having a distal end that may be extended into the second cavity or retracted therefrom. Each of the pins associated with the second mold is positionable such that the distal end of the pin extends into the second molding chamber a distance of from about 0.002 inches to about 0.140 inches as measured from the second molding surface. Each of the first and second molds are adapted to engage each other such that the first molding surface and the second molding surface form a generally spherical molding chamber. At least a portion of the raised protuberances in the first and second molding surfaces have a height, as measured from their respective molding surface, of from about 0.002 inches to about 0.140 inches.

In yet a further aspect, the present invention provides a process for forming a golf ball having a plurality of deep dimples. The process comprises a step of providing a molding apparatus having an upper mold including a first molding surface that defines at least one aperture. The upper mold further includes a selectively positionable pin in each of the apertures. The molding apparatus also includes a lower mold including a second molding surface that defines at least one aperture and also including a selectively positionable pin in each of the apertures. The pins of the upper and lower molds have a distal end that may be extended past the respective first and second molding surfaces. The upper and lower molds are adapted to engage each other such that the first molding surface and the second molding surface form a generally spherical molding chamber. The process also comprises a step of positioning a golf ball core or intermediate ball assembly within the molding chamber. The process includes an additional step of extending at least one the pins within the molding chamber so that the distal end of the extended pin contacts the golf ball core assembly or intermediate ball assembly. The process includes an additional step of introducing a molding material within the molding chamber and around the golf ball core or intermediate ball assembly to thereby form a layer of material around the golf ball core or intermediate ball assembly. The process includes another step of at least partially hardening the molding material. And, the process includes a step of retracting the pins to thereby form deep dimples in the resulting layered core or ball assembly.

In yet another aspect, the present invention provides a process for forming a golf ball having a plurality of deep dimples. The process comprises a step of providing a molding apparatus having an upper mold including a first molding surface that defines a first raised protuberance adapted to form a deep dimple and at least one aperture. The upper mold includes a selectively positionable pin in each of the apertures. The molding apparatus includes a lower mold having a second molding surface that defines a second raised protuberance adapted to form a deep dimple and at least one aperture. The lower mold further includes a selectively positionable pin in each of the apertures. The pins of the upper and lower molds have a distal end that may be extended past the respective first and second molding surface. The upper and lower molds are adapted to engage each other such that the first molding surface and the second molding surface form a generally spherical molding chamber. The process includes a step of positioning a golf ball core or intermediate ball assembly within the molding chamber. The process includes another step of extending at least one of the pins within the molding chamber so that the distal end of the extended pin contacts the golf ball core or intermediate ball assembly. The process further includes a step of introducing a molding material within the molding chamber and around a golf ball core or intermediate ball assembly to thereby form a layer of the molding material around a golf ball core or intermediate ball assembly. The process includes a step of at least partially hardening the molding material. And, the process includes a step of retracting the pins to thereby form additional deep dimples in the resulting layered core or ball assembly.

The invention accordingly comprises several apparatuses, processes, compositions, components and steps and the relation of one or more of such apparatuses, processes, compositions, components and steps with respect to each other. Moreover, the invention is directed to articles possessing the features, properties, and the relation of elements exemplified in the following detailed disclosure.

BRIEF DESCRIPTION OF THE DRAWINGS

The following is a brief description of the drawings, which are presented for the purposes of illustrating the present invention and not for the purposes of limiting the same.

DETAILED DESCRIPTION OF THE PREFERRED EMBODIMENTS

Figure 1:
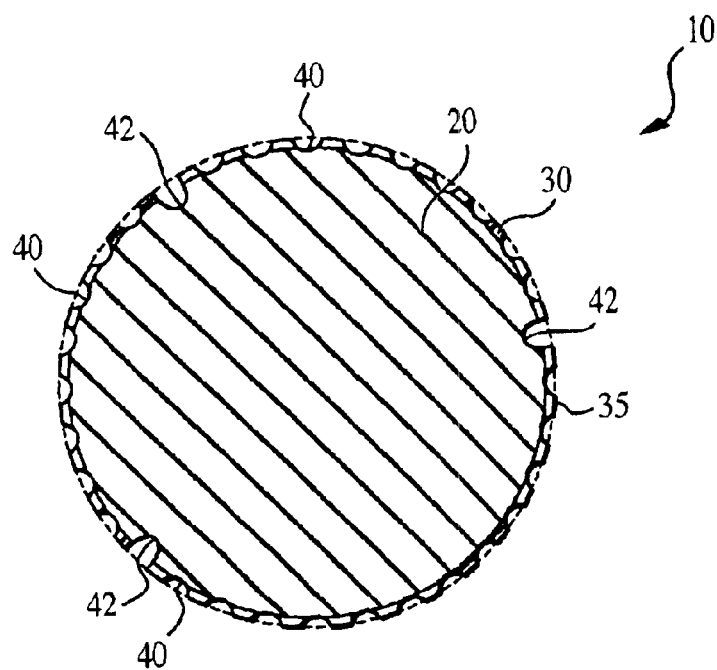
FIG. 1 is a cross-sectional view of a preferred embodiment golf ball according to the present invention having a core and a single cover layer having dimples, wherein one or more of the dimples extends through the cover to and/or into the underlying core.

The present invention relates to equipment and methods for producing improved golf balls, particularly a golf ball comprising a cover disposed about a core in which the cover has one or more, preferably a plurality of, deep dimples or apertures that extend through the outer cover to and/or into one or more layers underneath. The golf balls of the present invention, which can be of a standard or enlarged size, have a unique combination of cover thickness and dimple configuration.

The present invention is also directed to processes and apparatuses for forming golf balls with deep dimples by utilizing one or more specifically tailored "knock-out" pins that serve to support the core or ball assembly during molding. The pins also assist in removing the ball from the mold and in forming deep dimples in the mold ball. The pins are also preferably used in combination with other features in the mold to form deep dimples in the resulting ball.

As explained in greater detail herein, the present invention also relates to equipment and methods for forming one or more "deep dimples." These deep dimples have depths greater than other dimples on a ball. Preferably, such deep dimples extend through at least one cover layer to, and/or into, or essentially to, the underlying surface or component or layer.

With regard to dimple configuration or cross-sectional geometry, the present invention is based upon the identification of various particularly preferred characteristics as follows. Typically, for circular dimples, dimple diameter is used in characterizing dimple size rather than dimple circumference. The diameter of typical dimples may range from about 0.050 inches to about 0.250 inches. A preferred diameter of a typical dimple is about 0.150 inches. The deep dimples may have these same dimensions or may have dimensions as described in greater detail herein. As will be appreciated, circumference of a dimple can be calculated by multiplying the diameter times π.

The depth of typical dimples previously utilized in the trade may range from about 0.002 inches to about 0.020 inches, or as much as 0.050 inches. Preferably, a depth of about 0.010 inches is preferred for typical or conventional dimples. It is preferred that the depth of a deep dimple as described herein is greater than the depth of a typical dimple. Most preferably, the deep dimples have a depth that is deeper than the depth of the typical dimples by at least 0.002 inches.

Specifically, depth of a dimple may be defined in at least two fashions. A first approach is to extend a chord from one side of a dimple to another side and then measure the maximum distance from that chord to the bottom of the dimple. This is referred to herein as a chordal depth. Alternatively, another approach is to extend an imaginary line corresponding to the curvature of the outer surface of the ball over the dimple whose depth is to be measured. Then, the distance from that imaginary line to a bottom most point in the dimple is measured. This is referred to herein as a "periphery depth." The latter format of dimple depth determination is used herein unless noted otherwise.

As described herein, the deep dimples included in the present invention are particularly useful when molding certain layers or components about cores or intermediate ball assemblies. The deep dimples result from providing one or more protrusions or projections on the surfaces of the molding chamber, that also serves to support and properly position a golf ball core or intermediate ball assembly during molding. The depth of a deep dimple as described herein may range from about 0.002 inches to about 0.140 inches, more preferably from about 0.002 inches to about 0.050 inches, and more preferably from about 0.005 inches to about 0.040 inches. Preferably, a total depth of about 0.025 inches is desired. Greater or lesser depths for the deep dimples may be utilized. It is most preferred that the depth of a deep dimple as described herein is greater than the depth of a typical dimple, and extend to at least the outermost region of the mantle or core. Alternatively, the deep dimples preferably extend to the bottom of a matched set of dimples on the mantle or the core. The diameter of the deep dimples may be dissimilar, but preferably is the same as other dimples on a ball, and may range from about 0.025 inches to about 0.250 inches, and more preferably from about 0.050 inches to about 0.200 inches. A preferred diameter is about 0.150 inches. Generally, periphery depth is measured from the outer surface of a finished ball, unless stated otherwise.

In one embodiment, the present invention relates to an apparatus and technique for forming a golf ball comprising a core and a cover layer, wherein the cover layer provides dimples including one or more deep dimples that extend into the next inner layer or component. The cover may be a single layer or comprise multiple layers, such as two, three, four, five or more layers and the like. If the cover is a multi-layer cover, the dimples extend into at least the first inner cover layer, and may extend into a further inner cover layer, a mantle or intermediate layer, and/or the core. If the cover is a single layer, the deep dimples may extend into a mantle layer and/or the core. The cover layer(s) may be formed from any material suitable for use as a cover, including, but not limited to, ionomers, non-ionomers and blends of ionomers and non-ionomers.

In another embodiment, the present invention relates to an apparatus and technique for forming a golf ball comprising a core and a cover layer, wherein the cover layer provides dimples that extend to the core. The golf ball may optionally comprise a thin barrier coating between the core and the cover that limits the transition of moisture to the core. The barrier coating is preferably at least about 0.0001 inches thick. Preferably, the barrier layer is at least 0.003 inches thick. In a two-piece golf ball, a barrier coating is preferably provided between the core and the cover.

In a further embodiment, the present invention relates to equipment and processes for forming a golf ball having a plurality of dimples along its outer surface. In accordance with the present invention, one or more of these dimples are deep dimples that extend entirely through the cover layer of the ball, and into one or more underlying components or layers of the ball. For instance, for a golf ball comprising a core and a cover layer disposed about the core, the deep dimples preferably extend through the cover layer and into the core. The core or mantle layer may be "dimpled" such that the dimples on the core or mantle match up with and accept the deep dimples from the mold. If one or more layers such as an intermediate mantle layer are provided between the core and the cover layer, the deep dimples preferably extend through the cover layer and into one or more of those layers. The deep dimples may additionally extend into the core.

Specifically, in yet another aspect, the present invention provides a process for forming a cover layer for a golf ball comprising the steps of providing an intermediate ball comprising at least a core. The process also includes a step of providing a molding apparatus having a generally spherical molding chamber with a molding surface defined by (i) a first collection of raised regions for forming a collection of dimples on the cover layer, and (ii) a second collection of raised regions, each extending beyond the first collection of raised regions for concentrically positioning an object within the molding chamber. The molding apparatus also includes an assembly for administering a flowable material into the molding chamber. The process additionally includes a step of providing a flowable material suitable for use as the cover layer for the golf ball. The process also includes a step of positioning the intermediate ball within the molding chamber such that the second collection of raised regions of the molding surface contact and retain the intermediate ball within the molding chamber. This process also includes a step of administering the flowable material into the molding chamber and generally between the intermediate ball and the molding surface.

In yet another aspect, the present invention provides a process for forming a layer on a golf ball core. The method comprises the steps of providing a golf ball core and providing a flowable material adapted for forming the layer on the golf ball core. The process also includes a step of providing a mold including (i) a generally spherical molding chamber having an outer surface including a collection of raised protrusions that form a plurality of dimples in the layer, and (ii) provisions for introducing the flowable material into the molding chamber. The process also includes a step of concentrically positioning the golf ball core in the molding chamber such that the collection of raised protrusions contact the golf ball core. The process also includes a step of introducing the flowable material into the molding chamber such that the flowable material flows between the golf ball core and the outer surface of the molding chamber to thereby form the layer.

In still a further aspect, the present invention provides a process for forming a golf ball having at least one dimple that extends through an outer layer of the golf ball. The process comprises providing an intermediate golf ball assembly and providing a molding apparatus. The molding apparatus includes a generally spherical molding chamber having a first population of raised regions for forming a plurality of dimples on an outer layer of the golf ball. The molding chamber also includes at least one other raised region having a height that is greater than or equal to the thickness of the outer layer of the golf ball. The process additionally includes a step of positioning the intermediate golf ball assembly in the molding chamber. The process further includes a step of administering to the molding apparatus a flowable material adapted to form the outer layer of the golf ball.

Figure 2:
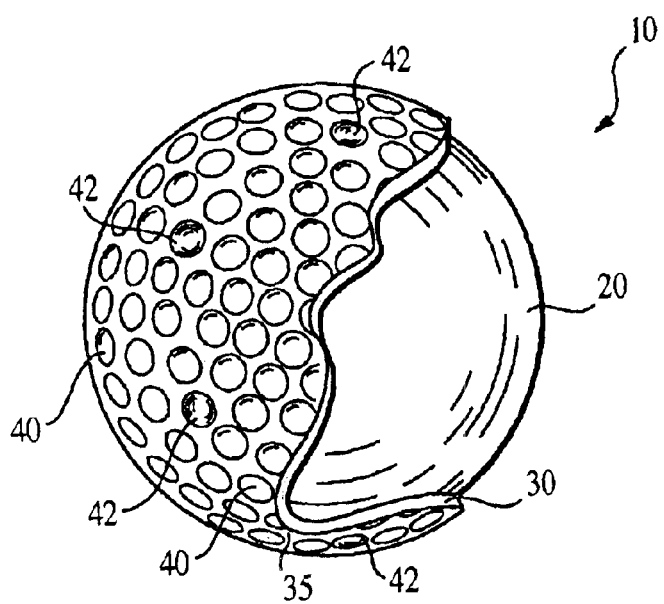
FIG. 2 is a diametrical cross-sectional view of the preferred embodiment golf ball illustrated in FIG. 1.

FIGS. 1 and 2 illustrate a preferred embodiment golf ball in accordance with the present invention. Specifically, FIGS. 1 and 2 illustrate a golf ball 10 comprising a core 20 having a cover layer 30 formed about the core. The cover layer 30 defines a plurality of dimples 40 along its outer surface 35. One or more of the dimples, and preferably two or more of the dimples, extend into the core 20 disposed underneath the cover layer 30. These dimples are herein referred to as deep dimples and shown in the figures as dimples 42.

Figure 3:
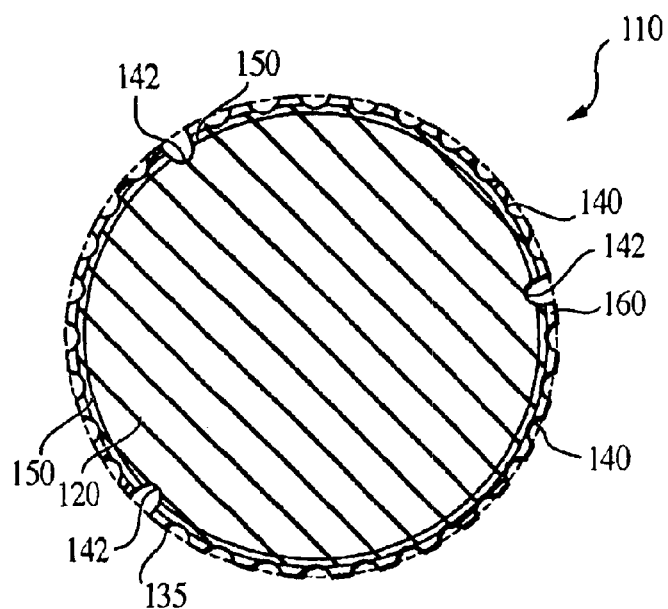
FIG. 3 is a cross-sectional view of another preferred embodiment golf ball according to the present invention having a core component and a cover component, wherein the cover component includes an inner cover layer and an outer cover layer having dimples formed therein, and wherein one or more of the dimples of the outer cover layer extends to and/or into the underlying inner cover layer.
Figure 4:
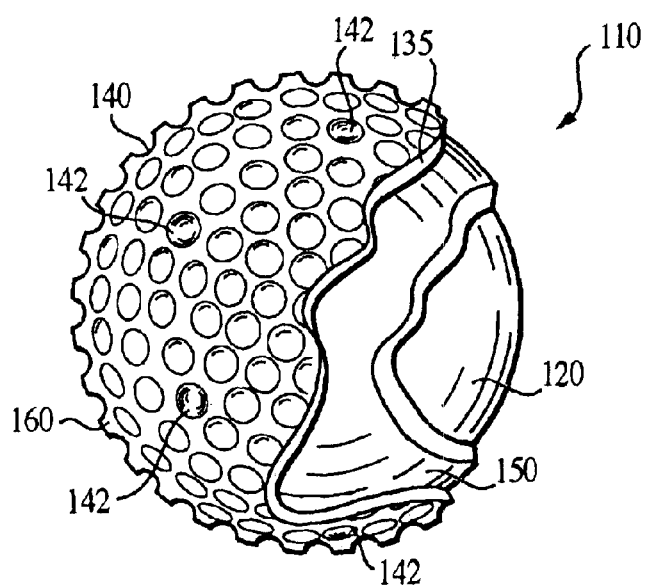
FIG. 4 is a diametrical cross-sectional view of the preferred embodiment golf ball illustrated in FIG. 3.

FIGS. 3 and 4 illustrate another preferred embodiment golf ball 110 in accordance with the present invention. The golf ball 110 comprises a core 120 having an inner cover layer 150 disposed thereon and an outer cover layer 160 formed about the inner cover layer 150. The cover layers 160 and 150 define a plurality of dimples 140 along the outer surface of the outer cover layer 160. One or more of the dimples, and preferably two or more of the dimples, and more preferably three or more of the dimples per hemisphere, extend entirely through the outer cover layer 160 and at least partially into the inner cover layer 150. These dimples, which extend through the outer cover layer, are again referred to herein as deep dimples and shown in the figures as dimples 142.

Figure 11:
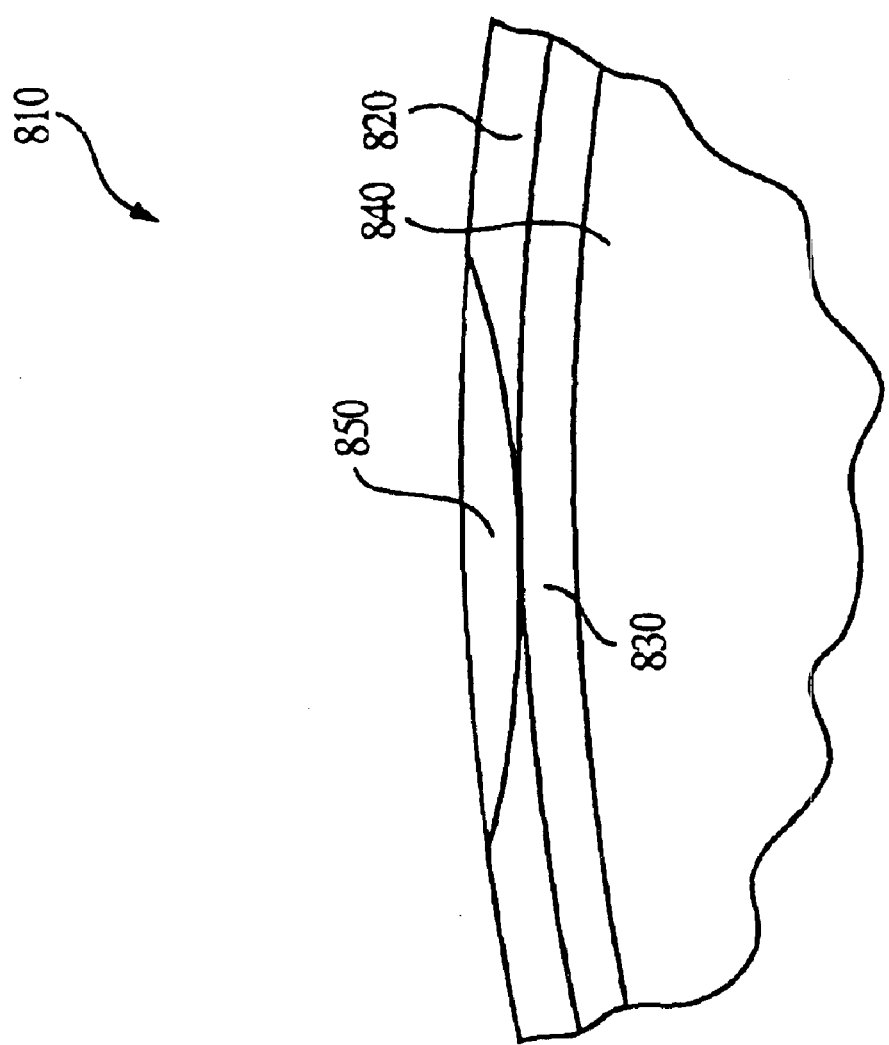
FIG. 11 is a cross-sectional detail view of a portion of a preferred embodiment golf ball according to the present invention having a core, an inner cover or mantle layer, and an outer cover layer illustrating a dimple that extends through the outer cover layer to the mantle layer.

FIG. 11 illustrates a partial cross section of a golf ball 810 defining a deep dimple 850 formed in an outer cover layer 820 disposed on a mantle layer 830 that in turn is disposed on a core 840. The deep dimple 850 has a common curvature. Alternatively, the deep dimples may be defined by regions of different curvature or shape. That is, a deep dimple according to the present invention may include one or more dimples defined within its interior. This is described in greater detail below.

The deep dimples, when viewed in a planar view, can be circular, non-circular, a combination of circular and non-circular, or any other shape desired. They may be of the same or differing shape, such as a circular larger dimple having an oval smaller dimple within the circular dimple, or an oval larger dimple having a circular or other shape within the larger dimple. The dimples do not have to be symmetrical. Generally, the deep dimples of the present invention may be spherical or non-spherical. Additionally, the portion of the deep dimple that extends to, or into the next inner layer or component may be the same or different size and/or shape as the outer portion of the dimple.

Figure 12:
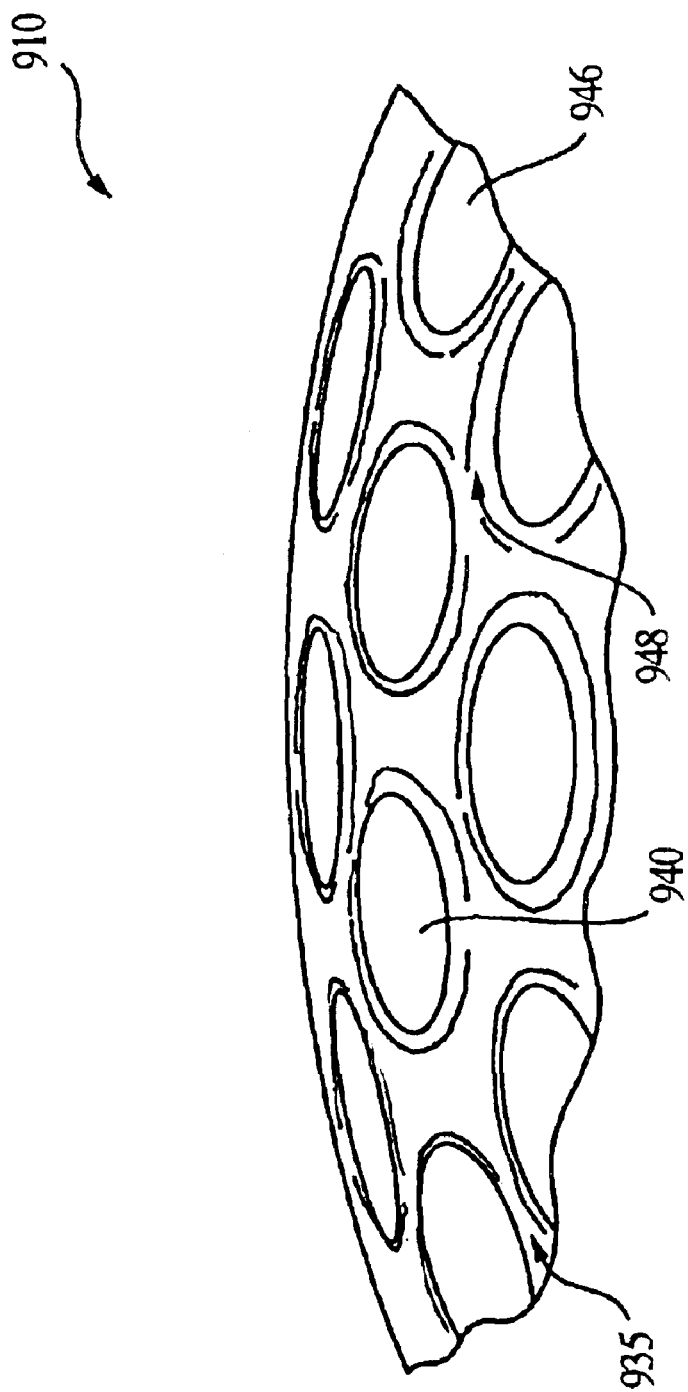
FIG. 12 is a top view of a portion of a preferred embodiment golf ball according to the present invention having a cover with dimples formed in two layers of the cover and illustrating an inner dimple portion formed in the inner cover layer and an outer dimple portion formed in the outer cover layer.

Providing deep dimples formed in multiple layers allows the dimple depth to be distributed over two or more layers. FIG. 12 illustrates dimples 940 formed in both the inner cover layer and the outer cover layer. The inner portion of the dimple 946 is formed in the inner cover layer, and the outer portion of the dimple 948 is formed in the outer cover layer. For a two-piece ball, dimples may be formed in the core and the single cover layer in the same way as previously described. Additionally, dimples may be formed in more than two cover and/or core layers if desired.

In another preferred embodiment, a multi-layer golf ball is produced that has one or more deep dimples that extend into the ball through at least one layer, such as an outer cover layer. In a further preferred embodiment, the deep dimple extends through at least two layers. The dimples of the at least two layers are configured with the same geometric coordinates (that is, the approximate center of the both dimples would be in the same location, and so the dimples are concentric with respect to each other), producing a golf ball having a dimpled layer over a dimpled layer. This allows for much thinner layers with traditional dimples. The dimples of one or more inner layers may be of varying depths, diameters and radii, yet still aligned with the dimples of the outer layer. This also allows for a dimple within a dimple, where there is a smaller dimple in at least one inner or mantle layer that is within a larger diameter dimple in the outer layer, such as the dimples shown in FIGS. 5 to 8.

FIGS. 5 to 8 illustrate a deep dimple that is a dual radius dimple, or a dimple within a dimple. One advantage of a dual radius dimple is that the deeper part of the dual radius may be filled in with a coating or other material. This provides an effective method for forming dimple depths to a desired value as compared to other methods of dimple formation. The dimple shape may be any shape desired, and each dimple may be the same or different shape. The shape of a dimple or region thereof is given when viewed in a direction extending along a diameter of the golf ball. The respective regions of the dual region dimples may be in a variety of different (or the same) shapes such as circular, elliptical, oval, square, triangular, and polygonal. Preferably, the depth of the second or deepest portion of the dual radius dimple may be expressed as a percentage of the total depth of the dimple. Specifically, the region or portion of the dimple that extends to the outermost surface of the ball may be referred to herein as the "major" dimple. And, likewise, the portion of the dimple that extends to the deepest portion or depth of the dimple can be referred to herein as the "minor" dimple. Accordingly, the preferred depth of the major dimple is approximately from about 40% to about 80% of the overall dimple depth. Accordingly, the preferred depth of the minor dimple is approximately 20% to about 60% of the overall dimple depth. The overall dimple depth is measured from a point along an outermost region of a phantom sphere extending within the region, or slightly above the region of, the outermost portion of the dimple to the bottom most portion of the dimple. With regard to diameters, the preferred diameter of the minor dimple is from about 10% to about 70% of the diameter of the major dimple.

Figure 5:
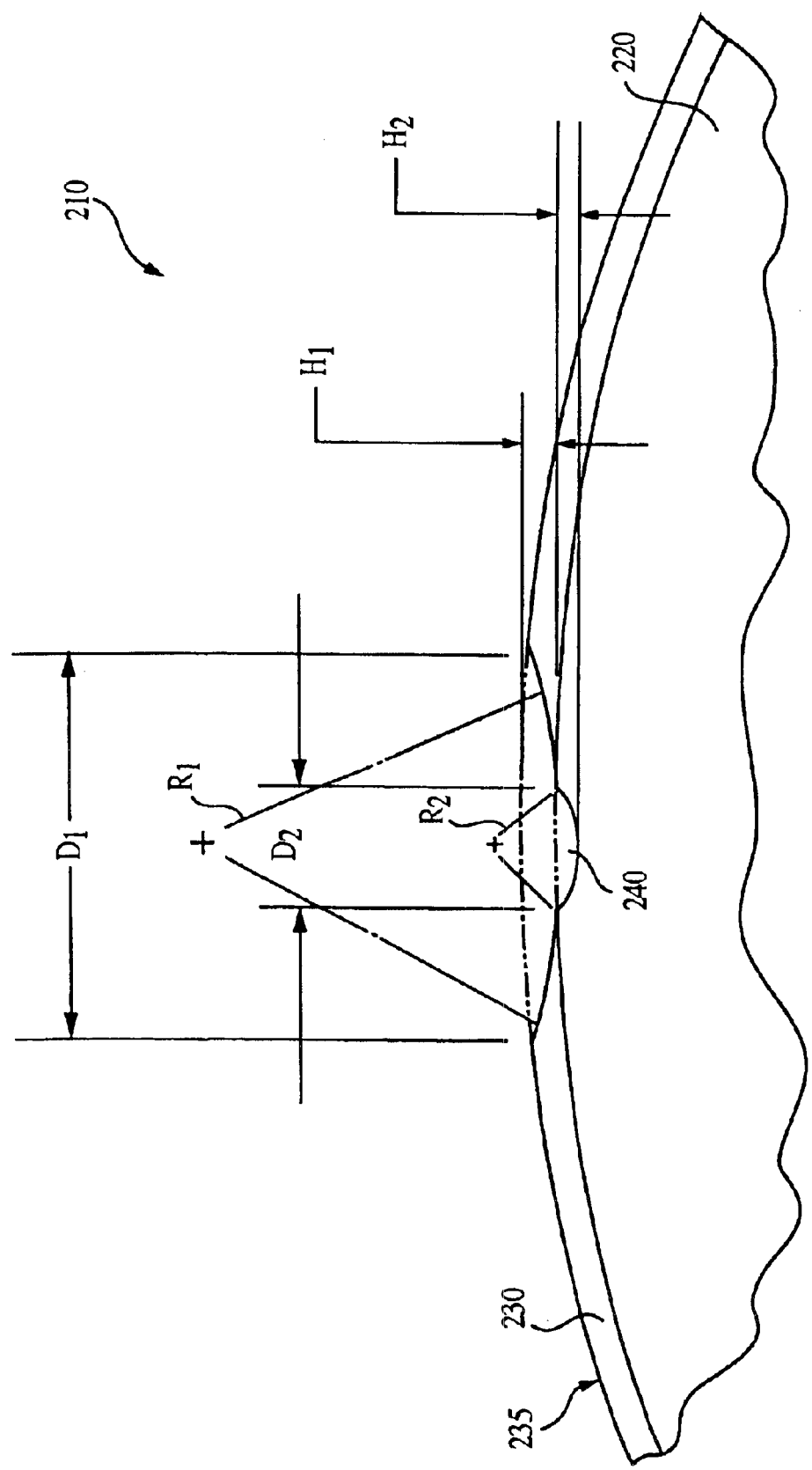
FIG. 5 is a cross-sectional detail view of a portion of a preferred embodiment golf ball according to the present invention having a core and a cover illustrating a dual radius dimple that extends through the cover into the underlying core.

FIG. 5 is a cross-sectional detail illustrating a portion of a preferred embodiment golf ball produced in accordance with the present invention. This preferred embodiment golf ball 210 comprises a core 220 having a cover layer 230 formed thereon. The cover layer defines at least one deep dimple 240 along its outer surface 235. As described in conjunction with FIGS. 1 and 2, it is preferred that one or more (preferably two or more, more preferably three or more per hemisphere) of the dimples extends entirely through the cover layer and into the core disposed underneath the cover layer. FIG. 5 illustrates a deep dimple defined by two different curvatures. Referring to FIG. 5, a first radius $R_1$ defines the portion of the dimple from the outer surface 235 of the golf ball 210 to a point at which the deep dimple extends into a layer underneath the cover layer. At this point, the curvature of the dimple changes and is defined by radius $R_2$. Preferably, $R_1$, is from about 0.130 inches to about 0.190 inches, and most preferably, $R_1$, is from about 0.140 to about 0.180 inches. For some embodiments, $R_1$ ranges from about 0.100 inches to about 1.000 inch, and most preferably from about 0.200 inches to about 0.800 inches. Preferably, $R_2$ is from about 0.025 inches to about 0.075 inches, and most preferably, $R_2$ is about 0.050 inches to about 0.065 inches.

For some embodiments, $R_2$ ranges from about 0.002 inches to about 0.50 inches, and most preferably from about 0.010 inches to about 0.200 inches. The overall diameter or span, generally referred to as the "chordal diameter," of the dimple 240 is designated herein as $D_1$. The diameter or span of the portion of the dimple that extends into the layer underneath the outer cover layer is designated herein as $D_2$. Preferably, $D_1$ is from about 0.030 inches to about 0.250 inches, more preferably from about 0.100 inches to about 0.186 inches, and most preferably, $D_1$ is about 0.146 inches to about 0.168 inches. For some embodiments, $D_1$ ranges from about 0.100 inches to about 0.250 inches, and most preferably $D_1$ is about 0.140 inches to about 0.180 inches. Preferably $D_2$ is from about 0.020 inches to about 0.160 inches, more preferably from about 0.030 inches to about 0.080 inches and most preferably, $D_2$ is about 0.056 inches. For some embodiments, $D_2$ is from about 0.040 inches to about 0.060 inches. Accordingly, the overall depth of the deep dimple portion that is defined by $R_1$ is designated herein as $H_1$ and the depth or portion of the dimple that is defined by $R_2$ is designated herein as $H_2$. Preferably, $H_1$ is from about 0.005 inches to about 0.135 inches, more preferably from about 0.005 inches to about 0.025 inches, more preferably from about 0.010 inches to about 0.015 inches, and most preferably, $H_1$ is about 0.015 inches. For some embodiments, $H_1$ is from about 0.005 inches to about 0.015 inches. $H_2$ may range from about 0.005 inches to about 0.135 inches, and more preferably from about 0.005 to about 0.050 inches. Preferably, $H_2$ ranges from about 0.005 inches to about 0.030 inches and is about 0.010 inches. For some embodiments $H_2$ is from about 0.005 inches to about 0.015 inches.

Figure 6:
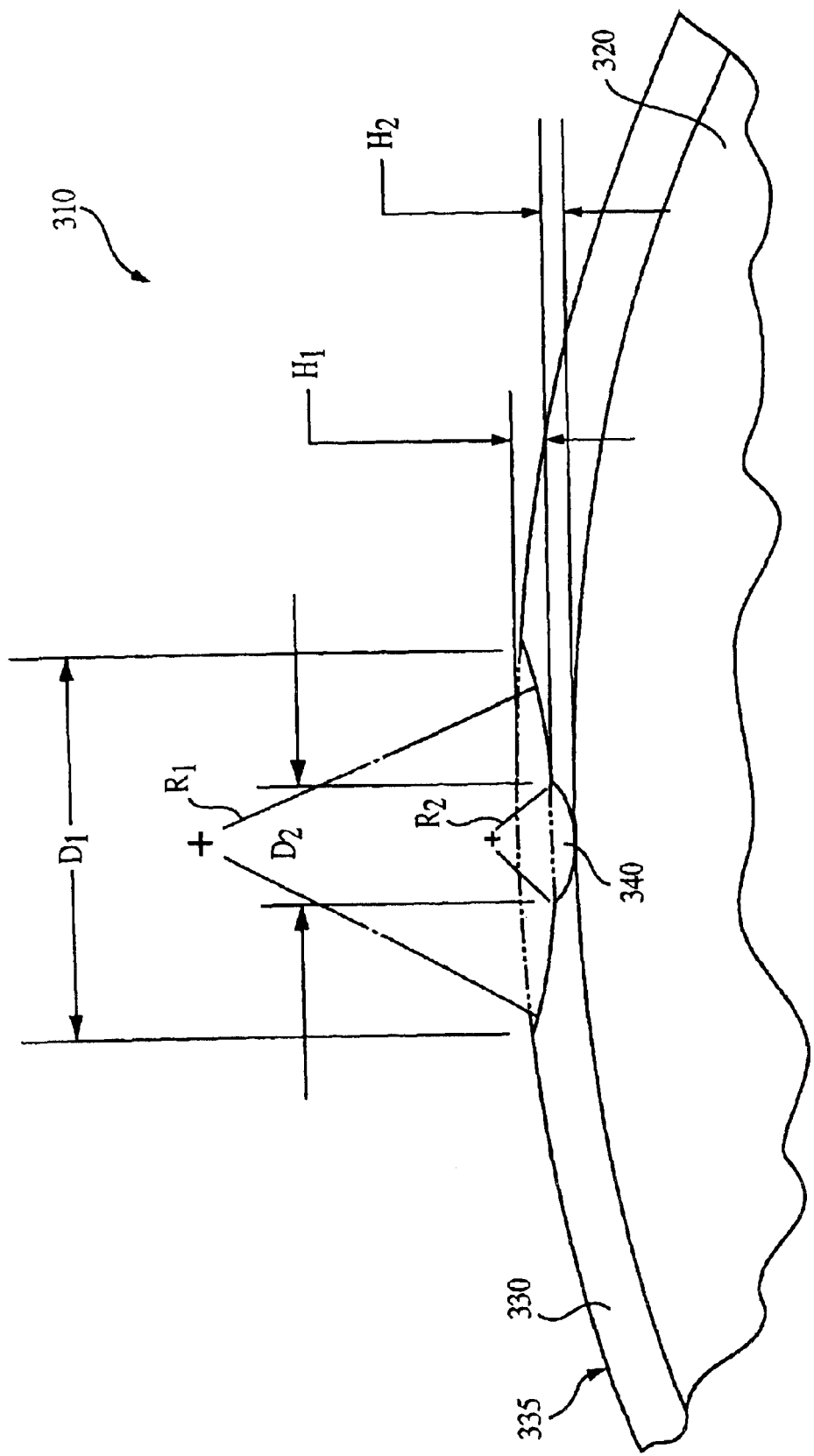
FIG. 6 is a cross-sectional detail view of a portion of a preferred embodiment golf ball according to the present invention having a core and a cover illustrating a dual radius dimple that extends through the outer cover layer to the outer surface of the core.

Referring to FIG. 6, another preferred embodiment golf ball 310 is illustrated. In this version of the present invention, a golf ball 310 comprises a core 320 and a cover layer 330 formed thereon. The cover layer 330 defines at least one deep dimple 340 along the outer surface 335 of the golf ball 310. As can be seen, the dimple 340 is defined by two different curvatures, each of which is defined by radii $R_2$ and $R_1$ as previously described with respect to FIG. 5. The other parameters $D_1$, $D_2$, $H_1$, and $H_2$ are as described with respect to FIG. 5. FIG. 6 illustrates an embodiment in which the dimple 340 extends to the core 320 and not significantly into the core. In contrast, the version illustrated in FIG. 5 is directed to a dimple configuration in which a dimple extends significantly into the underlying core.

Figure 7:
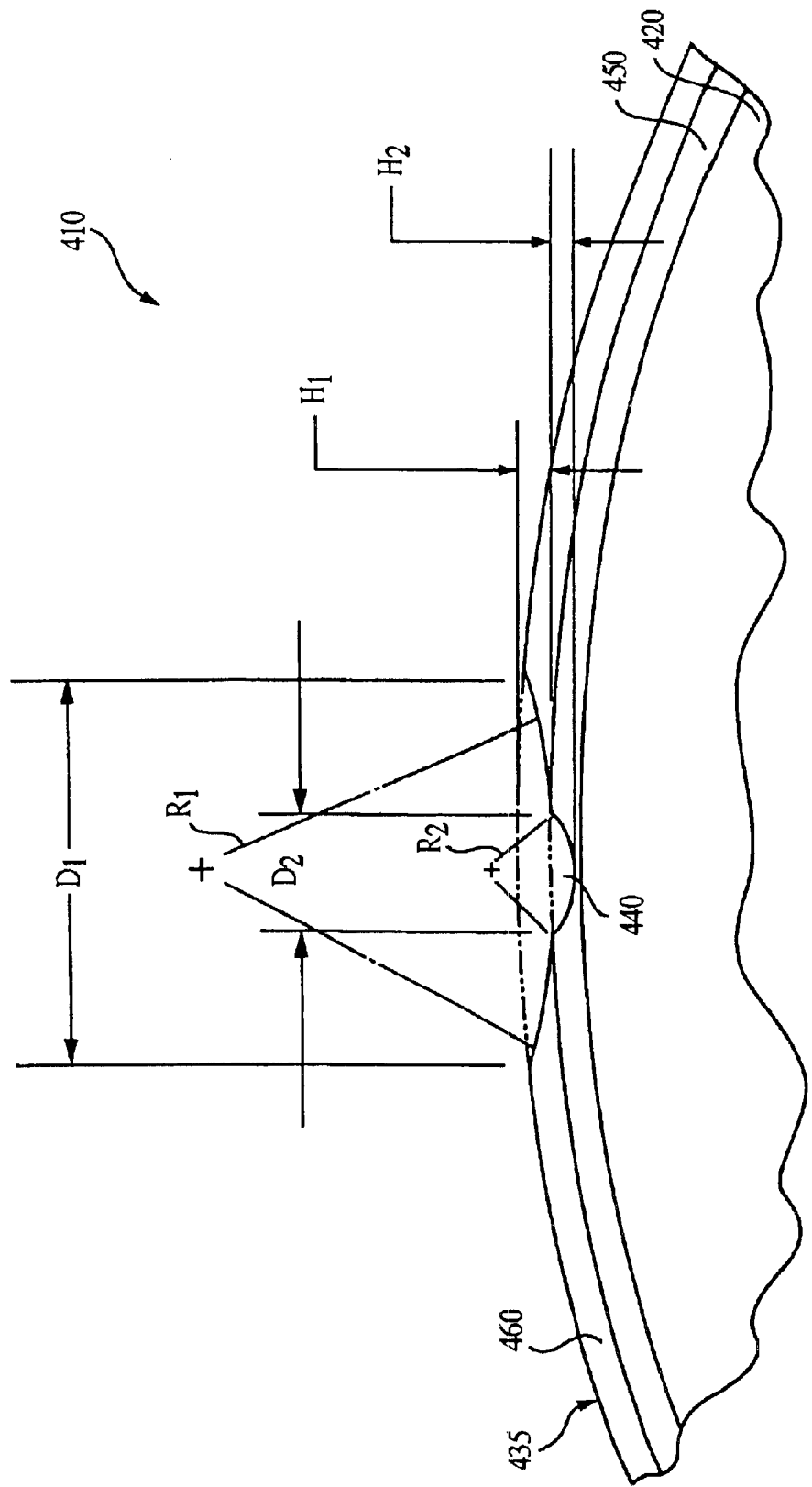
FIG. 7 is a cross-sectional detail view of a portion of a preferred embodiment golf ball according to the present invention having a core, an inner cover layer, and an outer cover layer, wherein the outer cover layer has a dual radius dimple that extends into the inner cover layer.

FIG. 7 illustrates a preferred embodiment golf ball 410 comprising a core 420, a mantle or inner cover layer 450, and an outer cover layer 460. The outer cover layer 460 defines at least one deep dimple 440 along the outer surface 435 of the ball 410. The dimple 440 is defined by two different regions or two curvatures, each of which is in turn defined by radii $R_2$ and $R_1$. The other parameters $D_1$, $D_2$, $H_1$, and $H_2$ are as described with respect to FIG. 5. As can be seen in FIG. 7, the dimple 440 extends entirely through the outer cover layer 460 and into the inner cover layer or mantle layer 450.

Figure 8:
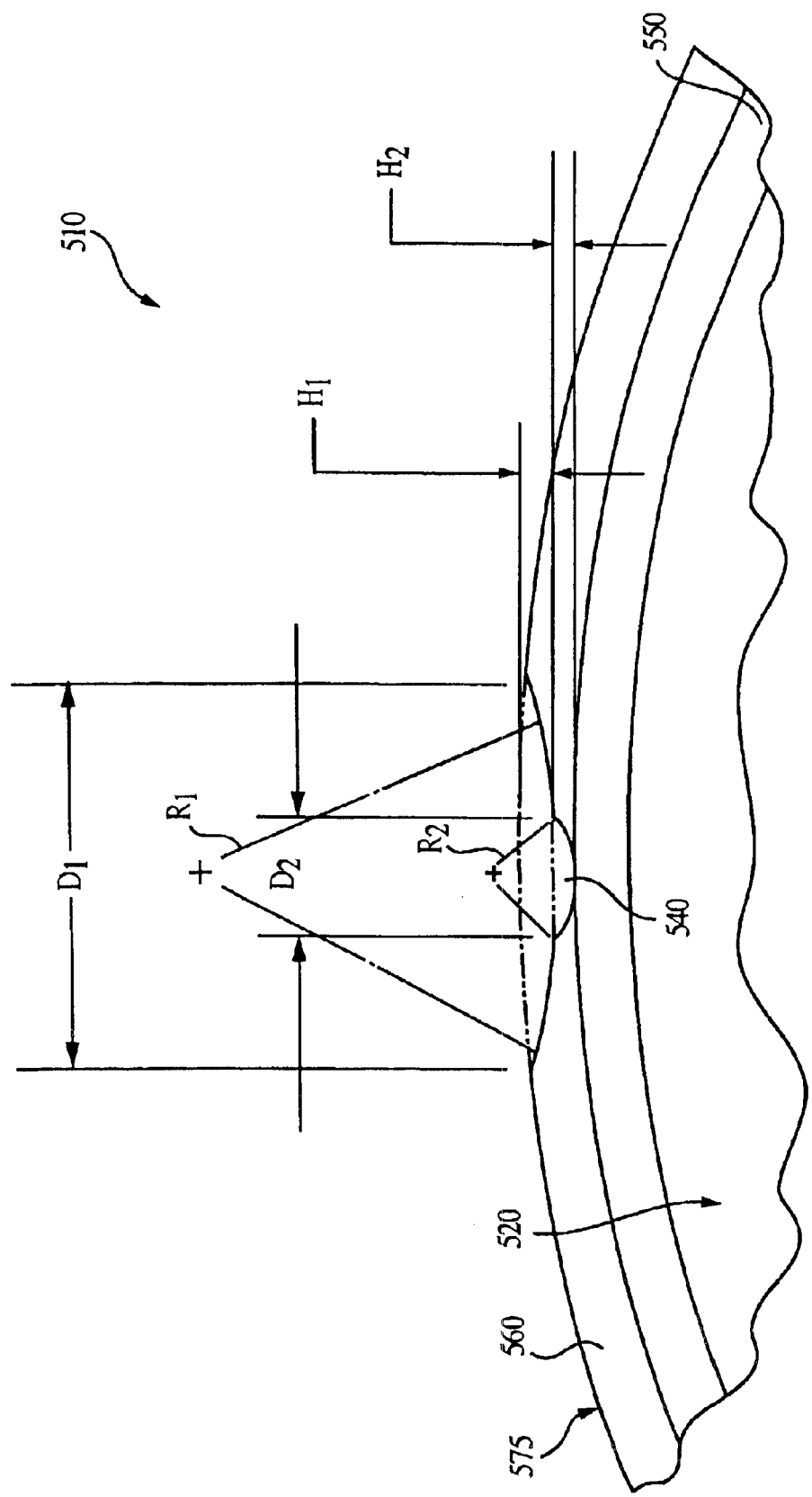
FIG. 8 is a cross-sectional detail view of a portion of a preferred embodiment golf ball according to the present invention having a core, an inner cover layer, and an outer cover layer illustrating a dual radius dimple that extends through the outer cover layer to the inner cover layer of the ball.

FIG. 8 illustrates another preferred embodiment golf ball 510 in accordance with the present invention. The golf ball 510 comprises a core 520 having disposed thereon an inner cover layer or mantle layer 550 and an outer cover layer 560. Defined along the perimeter or outer periphery of the ball 510 is at least one deep dimple 540. The dimple 540 is defined along the outer surface 535 of the ball 510. The dimple 540 has two different regions or curvatures each defined by radii $R_2$ and $R_1$. The other parameters $D_1$, $D_2$, $H_1$, and $H_2$ are as described with respect to FIG. 5. The version illustrated in FIG. 8 reveals a dimple 540 that does not significantly extend into the mantle layer or inner cover layer 550. Instead, the dimple 540 only extends to the outermost region of the mantle layer or inner cover layer 550.

In the various dual-radius dimples, dual region dimples, or dimples-within-dimples described herein, the present invention includes filling either or both of the regions with various materials. The filler materials are preferably different than cover materials, but may include such. Preferably, the filler materials incorporate one or more coloring agents.

An important characteristic of dimple configuration is the volume ratio. The volume ratio is the sum of the volume of all dimples taken below a chord extending across the top of a dimple, divided by the total volume of the ball. The volume ratio is a critical parameter for ball flight. A high volume ratio generally results in a low flying ball. And a low volume ratio often results in a high-flying ball. A preferred volume ratio is about 1%. The balls of the present invention however may be configured with greater or lesser volume ratios.

The number and/or layout of dimples will not necessarily change the coverage, i.e. surface area. A typical coverage for a ball of the present invention is about 60% to about 90% and preferably about 83.8%. In other embodiments this preferred coverage is about 84% to about 85%. These percentages are the percent of surface area of the ball occupied by dimples. It will be appreciated that the present invention golf balls may exhibit coverages greater or less than that amount.

For configurations utilizing dimples having two or more regions of different curvature, i.e. dimple within a dimple, there is less impact on the volume ratio than the use of deep dimples. If there are enough of either dimples within dimples or deep dimples, the aerodynamics of the ball will eventually be impacted.

The optimum or preferred number of deep dimples utilized per ball varies. It is the amount necessary to secure or center the core or intermediate ball during molding without adversely affecting the aerodynamics of the finished ball. However, the present invention includes the use of a relatively large number of deep dimples. That is, although most of the focus of the present invention is directed to the use of only a few deep dimples per golf ball, i.e. from 1 to 10, preferably 1 to 8, more preferably 1 to 6, the invention includes the use of a significantly greater number such as from about 50 to about 250. It is also contemplated that for some applications, it may be desirable to form all, or nearly all, dimples on a golf ball as deep dimples, such as for example, from about 50 to about 500.

In general, as dimples are made deeper, the ball will fly lower as compared to the use of dimples that are shallower. As the number of deep dimples increases, the ball will exhibit a lower flight trajectory. Accordingly, the preferred approach is to utilize a small number of deep dimples. However, for other applications, the present invention includes a ball with many deep dimples.

During molding, deep dimples can extend into the core or mantle. Generally, the deep dimples (or rather, the protrusions that extend from the molding surface that form the deep dimples and which are described in greater detail herein) will extend into, to, or substantially to the core from the molding cavity and contact or extend to or near the core. But, the core will rebound back to its original shape to some extent so that the volume of the dimple at the point of contact is less than would otherwise be expected. This is explained in greater detail below.

The overall shape of the dimples, including deep dimples, may be nearly any shape. For example, shapes such as hexagon, pentagon, triangle, ellipse, circle, etc. are all suitable. There is no limit to the number of shapes, although some shapes are preferred over others. At present, circular dimples are preferred. As for the cross-sectional configuration, the dimples may utilize any geometry. For instance, dimples may be defined by a constant curvature or a multiple curvature or dual radius configuration or an elliptical or teardrop shaped region.

Cover Layer(s)

The cover comprises at least one layer. For a multi-layer cover, the cover comprises at least two layers, and it may comprise any number of layers desired, such as two, three, four, five, six and the like. A two-piece cover comprises a first or inner layer or ply (also referred to as a mantle layer) and a second or outer layer or ply. The inner layer can be ionomer, ionomer blends, non-ionomer, non-ionomer blends, or blends of ionomer and non-ionomer. The outer layer can be ionomer, ionomer blends, non-ionomer, non-ionomer blends, or blends of ionomer and non-ionomer, and may be of the same or different material as the inner cover layer. For multi-layer covers having three or more layers, each layer can be ionomer, non-ionomer, or blends thereof, and the layers may be of the same or different materials.

In one preferred embodiment of a golf ball, the inner layer or single cover layer is comprised of a high acid (i.e. greater than 16 weight percent acid) ionomer resin or high acid ionomer blend. More preferably, the inner layer is comprised of a blend of two or more high acid (i.e. greater than 16 weight percent acid) ionomer resins neutralized to various extents by different metal cations. The inner cover layer may or may not include a metal stearate (e.g., zinc stearate) or other metal fatty acid salt. The purpose of the metal stearate or other metal fatty acid salt is to lower the cost of production without affecting the overall performance of the finished golf ball.

In a further embodiment, the inner layer or single cover layer is comprised of a low acid (i.e. 16 weight percent acid or less) ionomer resin or low acid ionomer blend. Preferably, the inner layer or single layer is comprised of a blend of two or more low acid (i.e. 16 weight percent acid or less) ionomer resins neutralized to various extents by different metal cations. As with the high acid inner cover layer embodied, the inner cover layer may or may not include a metal stearate (e.g., zinc stearate) or other metal fatty acid salt.

In golf balls having a multi-layer cover, it has been found that a hard inner layer(s) provides for a substantial increase in resilience (i.e., enhanced distance) over known multi-layer covered balls. A softer outer layer (or layers) provides for desirable "feel" and high spin rate while maintaining respectable resiliency. The soft outer layer allows the cover to deform more during impact and increases the area of contact between the club face and the cover, thereby imparting more spin on the ball. As a result, the soft cover provides the ball with a balata-like feel and playability characteristics with improved distance and durability. Consequently, the overall combination of the inner and outer cover layers results in a golf ball having enhanced resilience (improved travel distance) and durability (i.e. cut resistance, etc.) characteristics while maintaining and in many instances, improving, the playability properties of the ball.

The combination of a hard inner cover layer with a soft outer cover layer provides for excellent overall coefficient of restitution (for example, excellent resilience) because of the improved resiliency produced by the inner cover layer. While some improvement in resiliency is also produced by the outer cover layer, the outer cover layer generally provides for a more desirable feel and high spin, particularly at lower swing speeds with highly lofted clubs such as half wedge shots.

In one preferred embodiment, the inner cover layer may be harder than the outer cover layer and generally has a thickness in the range of 0.0005 to 0.15 inches, preferably 0.001 to 0.10 inches for a 1.68 inch ball, and sometimes slightly thicker for a 1.72 inch (or more) ball. The core and inner cover layer (if applicable) together preferably form an inner ball having a coefficient of restitution of 0.780 or more and more preferably 0.790 or more, and a diameter in the range of 1.48 to 1.66 inches for a 1.68 inch ball and 1.50 to 1.70 inches for a 1.72 inch (or more) ball.

The inner cover layer preferably has a Shore D hardness of 60 or more (or at least 90 Shore C). It is particularly advantageous if the golf balls of the invention have an inner layer with a Shore D hardness of 65 or more (or at least 100 Shore C). These measurements are made in general accordance to ASTM 2240 except that they are made on the ball itself and not on a plaque. If the inner layer is too soft or thin, it is sometimes difficult to measure the Shore D of the inner layer as the layer may puncture during measurement. In such circumstances, an alternative Shore C measurement should be utilized. Additionally, if the core (or inner layer) is harder than the layer being measured, this will sometimes influence the reading.

Moreover, if the Shore C or Shore D is measured on a plaque of material, different values than those measured on the ball will result. Consequently, when a Shore hardness measurement is referenced to herein, it is based on a measurement made on the ball, except if specific reference is made to plaque measurements.

The above-described characteristics of the inner cover layer provide an inner ball having a PGA compression of 100 or less. It is found that when the inner ball has a PGA compression of 90 or less, excellent playability results.

The inner layer compositions of the embodiments described herein may include the high acid ionomers such as those developed by E. I. DuPont de Nemours & Company under the trademark Surlyn® and by Exxon Corporation under the trademarks Escor® or Iotek®, or blends thereof. Examples of compositions which may be used as the inner layer herein are set forth in detail in U.S. Pat. No. 5,688,869, which is incorporated herein by reference. Of course, the inner layer high acid ionomer compositions are not limited in any way to those compositions set forth in said patent. Those compositions are incorporated herein by way of examples only.

The high acid ionomers which may be suitable for use in formulating the inner layer compositions are ionic copolymers which are the metal (such as sodium, zinc, magnesium, etc.) salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (for example, iso- or n-butylacrylate, etc.) can also be included to produce a softer terpolymer. The carboxylic acid groups of the copolymer are partially neutralized (for example, approximately 10–100%, preferably 30–70%) by the metal ions. Each of the high acid ionomer resins which may be included in the inner layer cover compositions of the invention contains greater than 16% by weight of a carboxylic acid, preferably from about 17% to about 25% by weight of a carboxylic acid, more preferably from about 18.5% to about 21.5% by weight of a carboxylic acid.

The high acid ionomeric resins available from Exxon under the designation Escor® or Iotek®, are somewhat similar to the high acid ionomeric resins available under the Surlyn® trademark. However, since the Escor®/Iotek® ionomeric resins are sodium, zinc, etc. salts of poly (ethylene-acrylic acid) and the Surlyn® resins are zinc, sodium, magnesium, etc. salts of poly(ethylene-methacrylic acid), distinct differences in properties exist. It is also contemplated to utilize commercially available resins that have been modified with ethylene/acrylic acid resins for example.

Examples of the high acid methacrylic acid based ionomers found suitable for use in accordance with this invention include, but are not limited to, Surlyn® 8220 and 8240 (both formerly known as forms of Surlyn® AD-8422), Surlyn® 9220 (zinc cation), Surlyn® SEP-503-1 (zinc cation), and Surlyn® SEP-503-2 (magnesium cation). Another high acid ionomer that may be suitable is Surlyn☐ Another high acid ionomer that may be suitable is Surlyn ☐ S6120. According to DuPont, all of these ionomers contain from about 18.5 to about 21.5% by weight methacrylic acid.

Examples of the high acid acrylic acid based ionomers suitable for use in the present invention also include, but are not limited to, the Escor® or Iotek® high acid ethylene acrylic acid ionomers produced by Exxon such as Ex 1001, 1002, 959, 960, 989, 990, 1003, 1004, 993, and 994. In this regard, Escor® or Iotek® 959 is a sodium ion neutralized ethylene-acrylic neutralized ethylene-acrylic acid copolymer. According to Exxon, Ioteks® 959 and 960 contained from about 19.0 to about 21.0% by weight acrylic acid with approximately 30 to about 70 percent of the acid groups neutralized with sodium and zinc ions, respectively.

Furthermore, as a result of the previous development by the assignee of this application of a number of high acid ionomers neutralized to various extents by several different types of metal cations, such as by manganese, lithium, potassium, calcium and nickel cations, several high acid ionomers and/or high acid ionomer blends besides sodium, zinc and magnesium high acid ionomers or ionomer blends are also available for golf ball cover production. It has been found that these additional cation neutralized high acid ionomer blends produce inner cover layer compositions exhibiting enhanced hardness and resilience due to synergies that occur during processing. Consequently, these metal cation neutralized high acid ionomer resins can be blended to produce substantially higher C.O.R.'s than those produced by the low acid ionomer inner cover compositions presently commercially available.

More particularly, several metal cation neutralized high acid ionomer resins have been produced by the assignee of this invention by neutralizing, to various extents, high acid copolymers of an alpha-olefin and an alpha, beta-unsaturated carboxylic acid with a wide variety of different metal cation salts. This discovery is the subject matter of U.S. Pat. No. 5,688,869, incorporated herein by reference. It has been found that numerous metal cation neutralized high acid ionomer resins can be obtained by reacting a high acid copolymer (i.e. a copolymer containing greater than 16% by weight acid, preferably from about 17 to about 25 weight percent acid, and more preferably about 20 weight percent acid), with a metal cation salt capable of ionizing or neutralizing the copolymer to the extent desired (for example, from about 10% to 90%).

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the inner cover layer of the golf ball of the invention may be selected from the group consisting of vinyl esters of aliphatic carboxylic acids wherein the acids have 2 to 10 carbon atoms, vinyl ethers wherein the alkyl groups contain 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 39 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

Along these lines, examples of the preferred high acid base copolymers which fulfill the criteria set forth above are a series of ethylene-acrylic copolymers which are commercially available from The Dow Chemical Company, Midland, Mich., under the Primacor® designation.

The metal cation salts utilized in the invention are those salts which provide the metal cations capable of neutralizing, to various extents, the carboxylic acid groups of the high acid copolymer. These include acetate, oxide or hydroxide salts of lithium, calcium, zinc, sodium, potassium, nickel, magnesium, and manganese.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide, and magnesium acetate. Sources of manganese include manganese acetate and manganese oxide.

The metal cation neutralized high acid ionomer resins are produced by reacting the high acid base copolymer with various amounts of the metal cation salts above the crystalline melting point of the copolymer, such as at a temperature from about 200° F. to about 500° F., preferably from about 250° F. to about 350° F. under high shear conditions at a pressure of from about 10 psi to 10,000 psi. Other well known blending techniques may also be used. The amount of metal cation salt utilized to produce the new metal cation neutralized high acid based ionomer resins is the quantity which provides a sufficient amount of the metal cations to neutralize the desired percentage of the carboxylic acid groups in the high acid copolymer. The extent of neutralization is generally from about 10% to about 90%.

A number of different types of metal cation neutralized high acid ionomers can be obtained from the above indicated process. These include high acid ionomer resins neutralized to various extents with manganese, lithium, potassium, calcium and nickel cations. In addition, when a high acid ethylene/acrylic acid copolymer is utilized as the base copolymer component of the invention and this component is subsequently neutralized to various extents with the metal cation salts producing acrylic acid based high acid ionomer resins neutralized with cations such as sodium, potassium, lithium, zinc, magnesium, manganese, calcium and nickel, several cation neutralized acrylic acid based high acid ionomer resins are produced.

When compared to low acid versions of similar cation neutralized ionomer resins, the metal cation neutralized high acid ionomer resins exhibit enhanced hardness, modulus and resilience characteristics. These are properties that are particularly desirable in a number of thermoplastic fields, including the field of golf ball manufacturing.

The low acid ionomers which may be suitable for use in formulating the inner layer compositions of the subject invention are ionic copolymers which are the metal (sodium, zinc, magnesium, etc.) salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (for example, iso- or n-butylacrylate, etc.) can also be included to produce a softer terpolymer. The carboxylic acid groups of the copolymer are partially neutralized (for example, approximately 10 to 100%, preferably 30 to 70%) by the metal ions. Each of the low acid ionomer resins which may be included in the inner layer cover compositions of the invention contains 16% by weight or less of a carboxylic acid.

The inner layer compositions may include the low acid ionomers such as those developed and sold by E. I. DuPont de Nemours & Company under the trademark Surlyn® and by Exxon Corporation under the trademarks Escor® or Iotek®, ionomers made in-situ, or blends thereof.

In one embodiment of the inner cover layer, a blend of high and low acid ionomer resins is used. These can be the ionomer resins described above, combined in a weight ratio which preferably is within the range of 10 to 90 to 90 to 10 percent high and low acid ionomer resins.

Another embodiment of the inner cover layer is a cover comprising a non-ionomeric thermoplastic material or thermoset material. Suitable non materials include, but are not limited to, metallocene catalyzed polyolefins or polyamides, polyamide/ionomer blends, polyphenylene ether/ionomer blends, etc., which have a Shore D hardness of at least 60 (or a Shore C hardness of at least about 90) and a flex modulus of greater than about 30,000 psi, preferably greater than about 50,000 psi, or other hardness and flex modulus values which are comparable to the properties of the ionomers described above. Other suitable materials include but are not limited to, thermoplastic or thermosetting polyurethanes, thermoplastic block polyesters, for example, a polyester elastomer such as that marketed by DuPont under the trademark Hytrel®, or thermoplastic block polyamides, for example, a polyether amide such as that marketed by Elf Atochem S. A. under the trademark Pebax®, a blend of two or more non-ionomeric thermoplastic elastomers, or a blend of one or more ionomers and one or more non-ionomeric thermoplastic elastomers. These materials can be blended with the ionomers described above in order to reduce cost relative to the use of higher quantities of ionomer. Although Hytrel® and Pebax® are sometimes more expensive than certain ionomers, these materials typically have higher densities than ionomers and have different resiliency characteristics at low impacts, and so, may be desirable.

Additional materials suitable for use in the inner cover layer or single cover layer of the present invention include polyurethanes. These are described in more detail below.

Any number of inner layers may be used. Each layer may be the same or different material as any other layer, and each may be of the same or different thickness. One or more of the inner layers, if applicable, may also be the same as the outer cover layer.

A core with a hard inner cover layer formed thereon generally provides the multi-layer golf ball with resilience and distance. In one preferred embodiment, the outer cover layer is comparatively softer than the inner cover layer. For a golf ball having a single cover layer and a core, the cover layer may be a soft cover layer, as described herein. The softness provides for the feel and playability characteristics typically associated with balata or balata-blend balls.

The soft outer cover layer or ply is comprised of a relatively soft, low flex modulus (about 500 psi to about 50,000 psi, preferably about 1,000 psi to about 20,000 psi, and more preferably about 5,000 psi to about 20,000 psi), preferably about 1,000 psi to about 20,000 psi, more preferably about 2,500 psi to about 20,000) material or blend of materials. The outer cover layer (or single cover layer, if applicable) comprises ionomers, non-ionomers, blends of ionomers, blends of non-ionomers and blends of ionomers and non-ionomers. Preferably, the outer cover layer comprises a polyurethane, a polyurea, a blend of two or more polyurethanes/polyureas, or a blend of one or more ionomers or one or more non-ionomeric thermoplastic materials with a polyurethane/polyurea, preferably a thermoplastic polyurethane or reaction injection molded polyurethane/polyurea (described in more detail below). The outer layer is 0.0005 to about 0.15 inches in thickness, preferably about 0.001 to about 0.10 inches in thickness, and sometimes slightly thicker for a 1.72 inch (or more) ball, but thick enough to achieve desired playability characteristics while minimizing expense. Thickness is defined as the average thickness of the non-dimpled areas of the outer cover layer. The outer cover layer preferably has a Shore D hardness of 60 or less (or less than 90 Shore C), and more preferably 55 or less (or about 80 Shore C or less).

In another preferred embodiment, the outer cover layer is comparatively harder than the inner cover layer. The outer layer is comprised of a relatively hard, higher flex modulus (about 40,000 psi or greater) material or blend of materials. The inner cover layer(s) may be a softer material such as a polyurethane or other non-ionomer, or a blend of materials, and the outer layer may be a harder material such as a harder ionomer, non-ionomer, or blend of materials.

Moreover, in alternative embodiments, either the inner and/or the outer cover layer (or single cover layer, if applicable) may also additionally comprise up to 100 wt % of a soft, low modulus, non-ionomeric thermoplastic or thermoset material. Non-ionomeric materials are suitable so long as they produce the playability and durability characteristics desired without adversely affecting the properties of the cover layer(s). These include, but are not limited to, styrene-butadiene-styrene block copolymers, including functionalized styrene-butadiene-styrene block copolymers, styrene-ethylene-butadiene-styrene (SEBS) block copolymers such as Kraton® materials from Shell Chem. Co., and functionalized SEBS block copolymers; metallocene catalyzed polyolefins; ionomer/rubber blends such as those in Spalding U.S. Pat. Nos. 4,986,545; 5,098,105 and 5,187,013; and, Hytrel® polyester elastomers from DuPont and Pebax® polyetheramides from Elf Atochem S.A.

The outer cover layer of the invention is formed over a core (and inner cover layer or layers if a multi-layer cover) to result in a golf ball having a coefficient of restitution of at least 0.770, more preferably at least 0.780, and most preferably at least 0.790. The coefficient of restitution of the ball will depend upon the properties of both the core and the cover. The PGA compression of the golf ball is 100 or less, and preferably is 90 or less.

In one preferred embodiment, the outer cover layer comprises a polyurethane, a polyurea or a blend of polyurethanes/polyureas. Polyurethanes are polymers that are used to form a broad range of products. They are generally formed by mixing two primary ingredients during processing. For the most commonly used polyurethanes, the two primary ingredients are a polyisocyanate (for example, diphenylmethane diisocyanate monomer ("MDI") and toluene diisocyanate ("TDI") and their derivatives) and a polyol (for example, a polyester polyol or a polyether polyol).

A wide range of combinations of polyisocyanates and polyols, as well as other ingredients, are available. Furthermore, the end-use properties of polyurethanes can be controlled by the type of polyurethane utilized, such as whether the material is thermoset (cross linked molecular structure not flowable with heat) or thermoplastic (linear molecular structure flowable with heat).

Cross linking occurs between the isocyanate groups (—NCO) and the polyol's hydroxyl end-groups (—OH). Additionally, the end-use characteristics of polyurethanes can also be controlled by different types of reactive chemicals and processing parameters. For example, catalysts are utilized to control polymerization rates. Depending upon the processing method, reaction rates can be very quick (as in the case for some reaction injection molding systems ("RIM")) or may be on the order of several hours or longer (as in several coating systems such as a cast system). Consequently, a great variety of polyurethanes are suitable for different end-uses.

Polyurethanes are typically classified as thermosetting or thermoplastic. A polyurethane becomes irreversibly "set" when a polyurethane prepolymer is cross linked with a polyfunctional curing agent, such as a polyamine or a polyol. The prepolymer typically is made from polyether or polyester. A prepolymer is typically an isocyanate terminated polymer that is produced by reacting an isocyanate with a moiety that has active hydrogen groups, such as a polyester and/or polyether polyol. The reactive moiety is a hydroxyl group. Diisocyanate polyethers are preferred because of their water resistance.

The physical properties of thermoset polyurethanes are controlled substantially by the degree of cross linking and by the hard and soft segment content. Tightly cross linked polyurethanes are fairly rigid and strong. A lower amount of cross linking results in materials that are flexible and resilient. Thermoplastic polyurethanes have some cross linking, but primarily by physical means such as hydrogen bonding. The crosslinking bonds can be reversibly broken by increasing temperature, such as during molding or extrusion. In this regard, thermoplastic polyurethanes can be injection molded, and extruded as sheet and blow film. They can be used up to about 400° F. and are available in a wide range of hardnesses.

Polyurethane materials suitable for the present invention may be formed by the reaction of a polyisocyanate, a polyol, and optionally one or more chain extenders. The polyol component includes any suitable polyether- or polyester polyol. Additionally, in an alternative embodiment, the polyol component is polybutadiene diol. The chain extenders include, but are not limited, to diols, triols and amine extenders. Any suitable polyisocyanate may be used to form a polyurethane according to the present invention. The polyisocyanate is preferably selected from the group of diisocyanates including, but not limited, to 4,4'-diphenylmethane diisocyanate ("MDI"); 2,4-toluene diisocyanate ("TDI"); m-xylylene diisocyanate ("XDI"); 4,4'-methylenebis (cyclohexyl isocyanate) ($H_{12}$MDI); hexamethylene diisocyanate; naphthalene-1,5,-diisocyanate ("NDI"); 3,3'-dimethyl-4,4'-biphenyl diisocyanate; 1,4-diisocyanate benzene; phenylene-1,4-diisocyanate("PPDI"); and 2,2,4- or 2,4,4-trimethyl hexamethylene diisocyanate ("TMDI").

Other less preferred diisocyanates include, but are not limited to, isophorone diisocyanate ("IPDI"); 1,4-cyclohexyl diisocyanate ("CHDI"); diphenylether-4,4'-diisocyanate; p,p'-diphenyl diisocyanate; lysine diisocyanate ("LDI"); 1,3-bis (isocyanato methyl) cyclohexane; and polymethylene polyphenyl isocyanate ("PMDI").

One additional polyurethane component that can be used in the present invention incorporates TMXDI ("META") aliphatic isocyanate (Cytec Industries, West Paterson, N.J.). Polyurethanes based on meta-tetramethylxylylene diisocyanate (TMXDI) can provide improved gloss retention UV light stability, thermal stability, and hydrolytic stability. Additionally, TMXDI ("META") aliphatic isocyanate has demonstrated favorable toxicological properties. Furthermore, because it has a low viscosity, it is usable with a wider range of diols (to polyurethane) and diamines (to polyureas). If TMXDI is used, it typically, but not necessarily, is added as a direct replacement for some or all of the other aliphatic isocyanates in accordance with the suggestions of the supplier. Because of slow reactivity of TMXDI, it may be useful or necessary to use catalysts to have practical demolding times. Hardness, tensile strength and elongation can be adjusted by adding further materials in accordance with the supplier's instructions.

The polyurethane which is selected for use as a golf ball cover preferably has a Shore D hardness (plaque) of from about 10 to about 55 (Shore C of about 15 to about 75), more preferably from about 25 to about 55 (Shore C of about 40 to about 75), and most preferably from about 30 to about 55 (Shore C of about 45 to about 75) for a soft cover layer and from about 20 to about 90, preferably about 30 to about 80, and more preferably about 40 to about 70 for a hard cover layer.

The polyurethane which is to be used for a cover layer preferably has a flex modulus from about 1 to about 310 Kpsi, more preferably from about 3 to about 100 Kpsi, and most preferably from about 3 to about 40 Kpsi for a soft cover layer and 40 to 90 Kpsi for a hard cover layer. Accordingly, covers comprising these materials exhibit similar properties. The polyurethane preferably has good light fastness.

Non-limiting examples of a polyurethane suitable for use in the outer cover layer (or inner cover layer) include a thermoplastic polyester polyurethane such as Bayer Corporation's Texin® polyester polyurethane (such as Texin®

DP7-1097 and Texin® 5285 grades) and a polyester polyurethane such as B. F. Goodrich Company's Estane® polyester polyurethane (such as Estane® X-4517 grade). The thermoplastic polyurethane material may be blended with a soft ionomer or other non-ionomer. For example, polyamides blend well with soft ionomer.

Other soft, relatively low modulus non-ionomeric thermoplastic or thermoset polyurethanes may also be utilized to produce the outer cover layers, or any of the inner cover layers, as long as the non-ionomeric materials produce the playability and durability characteristics desired without adversely affecting the enhanced travel distance characteristic produced by the high acid ionomer resin composition. These include, but are not limited to thermoplastic polyurethanes such as the Pellethane® thermoplastic polyurethanes from Dow Chemical Co.; and non-ionomeric thermoset polyurethanes including but not limited to those disclosed in U.S. Pat. No. 5,334,673, incorporated herein by reference.

Typically, there are two classes of thermoplastic polyurethane materials: aliphatic polyurethanes and aromatic polyurethanes. The aliphatic materials are produced from a polyol or polyols and aliphatic isocyanates, such as $H_{12}$MDI or HDI, and the aromatic materials are produced from a polyol or polyols and aromatic isocyanates, such as MDI or TDI. The thermoplastic polyurethanes may also be produced from a blend of both aliphatic and aromatic materials, such as a blend of HDI and TDI with a polyol or polyols.

Generally, the aliphatic thermoplastic polyurethanes are lightfast, meaning that they do not yellow appreciably upon exposure to ultraviolet light.

Conversely, aromatic thermoplastic polyurethanes tend to yellow upon exposure to ultraviolet light. One method of stopping the yellowing of the aromatic materials is to paint the outer surface of the finished ball with a coating containing a pigment, such as titanium dioxide, so that the ultraviolet light is prevented from reaching the surface of the ball. Another method is to add UV absorbers, optical brighteners and stabilizers to the clear coating(s) on the outer cover, as well as to the thermoplastic polyurethane material itself. By adding UV absorbers and stabilizers to the thermoplastic polyurethane and the coating(s), aromatic polyurethanes can be effectively used in the outer cover layer of golf balls. This is advantageous because aromatic polyurethanes typically have better scuff resistance characteristics than aliphatic polyurethanes, and the aromatic polyurethanes typically cost less than the aliphatic polyurethanes.

Other suitable polyurethane materials for use in the present invention golf balls include reaction injection molded ("RIM") polyurethanes. RIM is a process by which highly reactive liquids are injected into a closed mold, mixed usually by impingement and/or mechanical mixing in an in-line device such as a "peanut mixer," where they polymerize primarily in the mold to form a coherent, one-piece molded article. The RIM process usually involves a rapid reaction between one or more reactive components such as a polyether polyol or polyester polyol, polyamine, or other material with an active hydrogen, and one or more isocyanate-containing constituents, often in the presence of a catalyst.

The constituents are stored in separate tanks prior to molding and may be first mixed in a mix head upstream of a mold and then injected into the mold. The liquid streams are metered in the desired weight to weight ratio and fed into an impingement mix head, with mixing occurring under high pressure, for example, 1,500 to 3,000 psi. The liquid streams impinge upon each other in the mixing chamber of the mix head and the mixture is injected into the mold. One of the liquid streams typically contains a catalyst for the reaction. The constituents react rapidly after mixing to gel and form polyurethane polymers. Polyureas, epoxies, and various unsaturated polyesters also can be molded by RIM.

Non-limiting examples of suitable RIM systems for use in the present invention are Bayflex® elastomeric polyurethane RIM systems, Baydur® GS solid polyurethane RIM systems, Prism® solid polyurethane RIM systems, all from Bayer Corp. (Pittsburgh, Pa.), Spectrim® reaction moldable polyurethane and polyurea systems from Dow Chemical USA (Midland, Mich.), including Spectrime MM 373-A (isocyanate) and 373-B (polyol), and Elastolit® SR systems from BASF (Parsippany, N.J.). Preferred RIM systems include Bayflexe MP-10000, Bayflexe MP-7500, MP-5000 and Bayflexe 110-50, filled and unfilled. Further preferred examples are polyols, polyamines and isocyanates formed by processes for recycling polyurethanes and polyureas. Additionally, these various systems may be modified by incorporating a butadiene component in the diol agent.

Another preferred embodiment is a golf ball in which at least one of the inner cover layer and/or the outer cover layer comprises a fast-chemical-reaction-produced component. This component comprises at least one material selected from the group consisting of polyurethane, polyurea, polyurethane ionomer, epoxy, and unsaturated polyesters, and preferably comprises polyurethane, polyurea or a blend comprising polyurethanes and/or polymers. A particularly preferred form of the invention is a golf ball with a cover comprising polyurethane or a polyurethane blend.

The polyol component typically contains additives, such as stabilizers, flow modifiers, catalysts, combustion modifiers, blowing agents, fillers, pigments, optical brighteners, and release agents to modify physical characteristics of the cover. Polyurethane/polyurea constituent molecules that were derived from recycled polyurethane can be added in the polyol component.

A golf ball inner cover layer or single cover layer according to the present invention formed from a polyurethane material typically contains from about 0 to about 60 weight percent of filler material, more preferably from about 1 to about 30 weight percent, and most preferably from about 1 to about 20 weight percent.

A golf ball outer cover layer according to the present invention formed from a polyurethane material typically contains from about 0 to about 20 weight percent of filler material, more preferably from about 1 to about 10 weight percent, and most preferably from about 1 to about 5 weight percent.

Additional materials may also be added to the inner and outer cover layer of the present invention as long as they do not substantially reduce the playability properties of the ball. Such materials include dyes and/or optical brighteners (for example, Ultramarine Blue™ sold by Whittaker, Clark, and Daniels of South Plainsfield, N.J.) (see U.S. Pat. No. 4,679,795); pigments such as titanium dioxide, zinc oxide, barium sulfate and zinc sulfate; UV absorbers; antioxidants; antistatic agents; and stabilizers. Moreover, the cover compositions of the present invention may also contain softening agents such as those disclosed in U.S. Pat. Nos. 5,312,857 and 5,306,760, including plasticizers, metal stearates, processing acids, and the like, and reinforcing materials such as glass fibers and inorganic fillers, as long as the desired properties produced by the golf ball covers of the invention are not impaired.

Core Layer(s)

The core of the golf ball can be formed of a solid, a liquid, or any other substance that will result in a core or an inner ball (core and at least one inner cover layer, if the ball is a multi-layer ball), having the desired COR, compression and hardness and other physical properties.

The cores of the inventive golf balls typically have a coefficient of restitution of about 0.750 or more, more preferably 0.770 or more and a PGA compression of about 90 or less, and more preferably 70 or less. Furthermore, in some applications it may be desirable to provide a core with a coefficient of restitution of about 0.780 to 0.790 or more. The core used in the golf ball of the invention preferably is a solid, but any core type known in the art may be used, such as wound, liquid, hollow, metal, and the like. The term "solid cores" as used herein refers not only to one piece cores but also to those cores having a separate solid layer beneath the covers and over the central core. The cores generally have a weight of about 25 to about 40 grams and preferably about 30 to about 40 grams. Larger and heavier cores, or lighter and smaller cores, may also be used when there is no desire to meet U.S.G.A. or R. & A. standards.

When the golf ball of the invention has a solid core, this core can be compression molded from a slug of uncured or lightly cured elastomer composition comprising a high cis content polybutadiene and a metal salt of an $\alpha$, $\beta$, ethylenically unsaturated carboxylic acid such as zinc mono- or diacrylate or methacrylate. To achieve higher coefficients of restitution and/or to increase hardness in the core, the manufacturer may include a small amount of a metal oxide such as zinc oxide. In addition, larger amounts of metal oxide than are needed to achieve the desired coefficient may be included in order to increase the core weight so that the finished ball more closely approaches the U.S.G.A. upper weight limit of 1.620 ounces.

Non-limiting examples of other materials that may be used in the core composition include, but are not limited to, compatible rubbers or ionomers, and low molecular weight fatty acids such as stearic acid. Free radical initiator catalysts such as peroxides may be admixed with the core composition so that on the application of heat and pressure, a curing or cross-linking reaction takes place. The core may also be formed from any other process for molding golf ball cores known in the art.

A thread wound core may comprise a liquid, solid, gel or multi-piece center. The thread wound core is typically obtained by winding a thread of natural or synthetic rubber, or thermoplastic or thermosetting elastomer such as polyurethane, polyester, polyamide, etc. on a solid, liquid, gel or gas filled center to form a thread rubber layer that is then covered with one or more mantle or cover layers. Additionally, prior to applying the cover layer(s), the thread wound core may be further treated or coated with an adhesive layer, protective layer, or any substance that may improve the integrity of the wound core during application of the cover layers and ultimately in usage as a golf ball.

Since the core material is not an integral part of the present invention, a detailed discussion concerning the specific types of core materials which may be utilized with the cover compositions of the invention are not specifically set forth herein.

Manufacturing Golf Balls

In accordance with a preferred technique of the invention, one or more deep dimples are formed that extend to or into various internal layers or components of a golf ball. Specifically, each layer of the preferred embodiment golf balls has dimples formed therein by a dimpled cavity having a pattern having the same geometric coordinates as other corresponding dimpled cavities. The core or core and inner layer(s) need to be aligned such that the dimples are formed over one another in the subsequent layers. For example, for a dimple in a preferred embodiment ball of the present invention, the outer layer may account for a portion of the total depth, and the inner layer(s) will account for the remainder. In a traditional prior art ball, the dimple depth, which is generally about 0.010 inches, is generally less than the thickness of the cover so that the dimple does not touch or extend to the next layer or even come close to the next layer. Therefore, there is a minimum cover thickness that can be used in order to have dimples of the desired depth. The present invention eliminates the need to have a cover thickness greater than the desired dimple depth because two or more layers can make up the dimple, and thus, each layer may be very thin (less than 0.010 inches).

Furthermore, the golf balls of the present invention may incorporate both deep dimples and dual dimples (dimple within a dimple) or dimples formed in multiple layers, as previously described.

In preparing golf balls in accordance with a preferred embodiment process of the present invention, a single cover layer or an inner cover layer (or mantle layer) is molded about a core (preferably a solid core). The cover layer(s) may be molded using any molding processing known in the art. Examples of molding processes include, but are not limited to, injection molding, transfer molding, reaction injection molding, liquid injection molding, casting, compression molding, and the like.

For a multi-layer ball, as shown in FIGS. 3 and 4, an outer layer 160 is molded over the inner layer 150. The core (or core and inner layer(s)) is supported by one or more, preferably two or more, support pins or protrusions which form the deep dimples that contact the core or intermediate ball assembly. That is, the exterior surface of the support pins or protrusions form the inner surface of the deep dimples.

The core (or core and inner layer(s)) is held in place by a holding force created by designing the dimples, or rather the raised projections on a molding surface that form such dimples, deep enough to grip the ball by slightly pre-loading the core or intermediate ball assembly. Ignoring friction, the only force generated is in the radial direction, and radial pre-load force is proportional to radial interference between the deep dimples and the core or core and inner layer(s).

The number of deep dimples on a golf ball of the present invention may vary as desired. Any number and pattern of deep dimples may be used, although a limited number of deep dimples in a specific geometric pattern is preferred. The geometric pattern is preferably approximately centered about the pole of the ball. Given the limited number of coordinates or points, it is generally not possible to exactly center certain geometric patterns with some shapes, such as a triangle. Additionally, it may be desirable to shift the pattern slightly to accommodate different forces (due to the molding of the layer(s)) on different sides of the ball.

Figure 9:
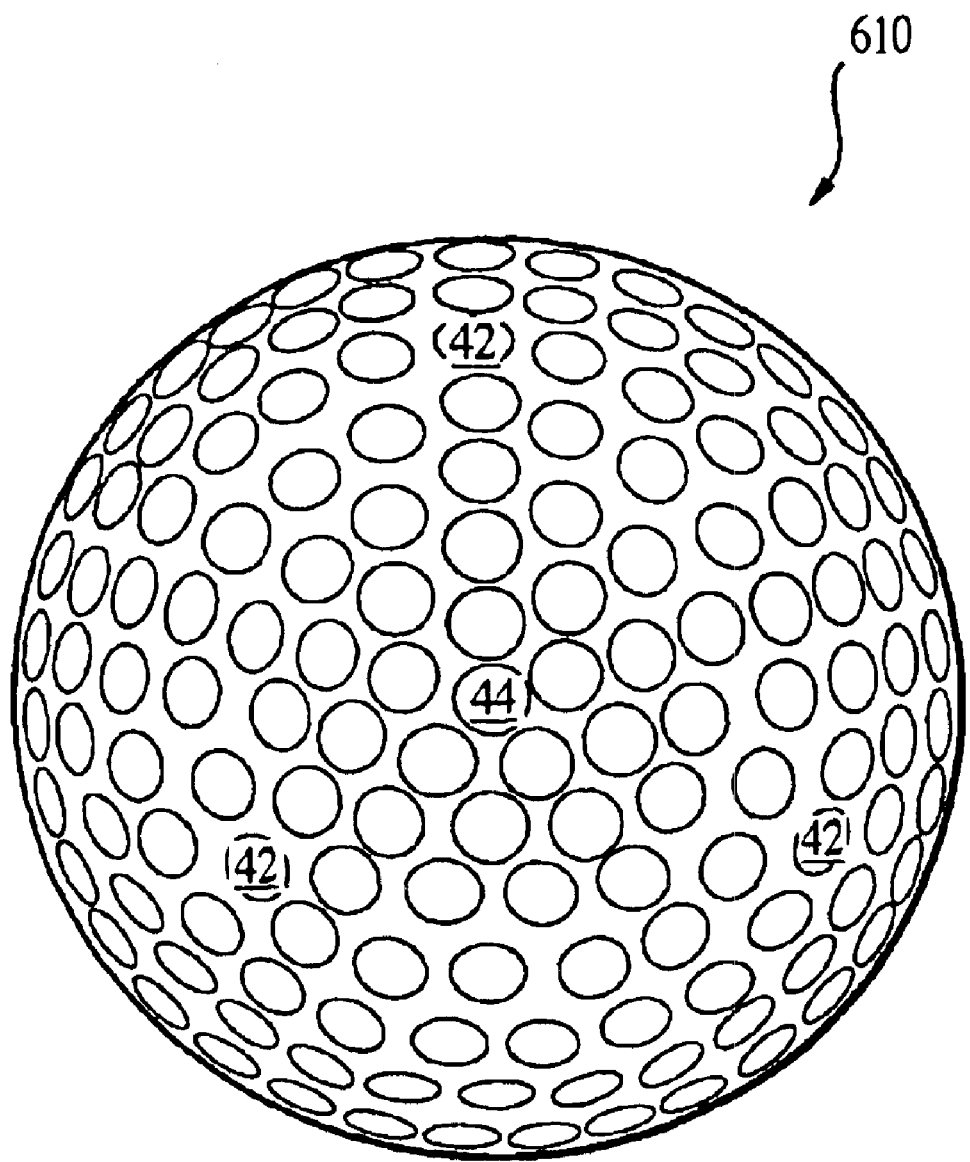
FIG. 9 is a top view of a preferred embodiment golf ball according to the present invention having a first population of typical dimples along with three deeper dimples configured in a triangular pattern about the pole of the ball.
Figure 10:
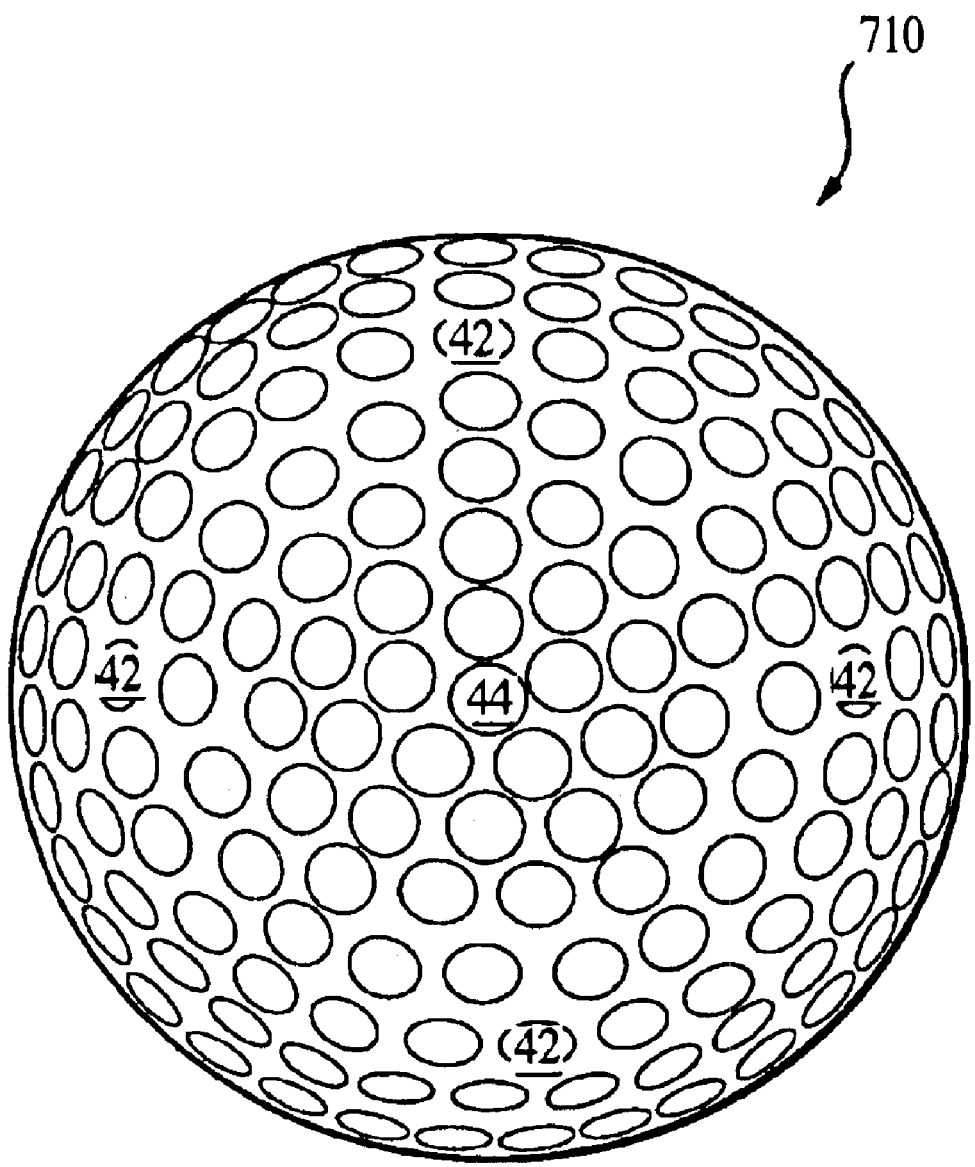
FIG. 10 is a top view of a preferred embodiment golf ball according to the present invention having a first population of typical dimples along with four deeper dimples arranged in a diamond pattern about the pole of the ball.

FIGS. 9 and 10 are top views (one hemisphere of the ball) of a golf ball having certain preferred arrangements of deep dimples. FIG. 9 illustrates a golf ball 610 having a triangular arrangement of three deep dimples 42 located approximately symmetrically around a pole 44. FIG. 10 illustrates a golf ball 710 having a diamond shaped arrangement of four deep dimples 42 located approximately symmetrically around a pole 44. The figures are for illustrative purposes since any desired number of deep dimples may be used, such as one, two, three, four, five, six and the like. The deep dimples do not have to be symmetrically located, although symmetry enhances their aerodynamic effect. This results in a finished ball where the deep dimples extend from the outer layer into the next inner layer(s) and/or the core. Multiple cover layers, of the same or different materials and thicknesses, may be added to the ball using this procedure. The deep dimples may extend into multiple layers if there are multiple layers on the ball, if desired.

The deep dimple locations may be anywhere on the ball, such as at about 30 degrees latitude on each hemisphere, about 40 to 45 degrees latitude, about 50 to 60 degrees latitude, and the like. That is, the deep dimples may be within a region along the outer surface of a ball from about 30 degrees latitude to about 60 degrees latitude in either or both hemispheres. Preferably, the deep dimples are located at about 40 to 45 degrees latitude or more on each hemisphere. As used herein, latitude refers to the location of the dimple on the ball, with the equator defined as 0 degrees latitude, and each pole of the ball defined as 90 degrees latitude.

Figure 13:
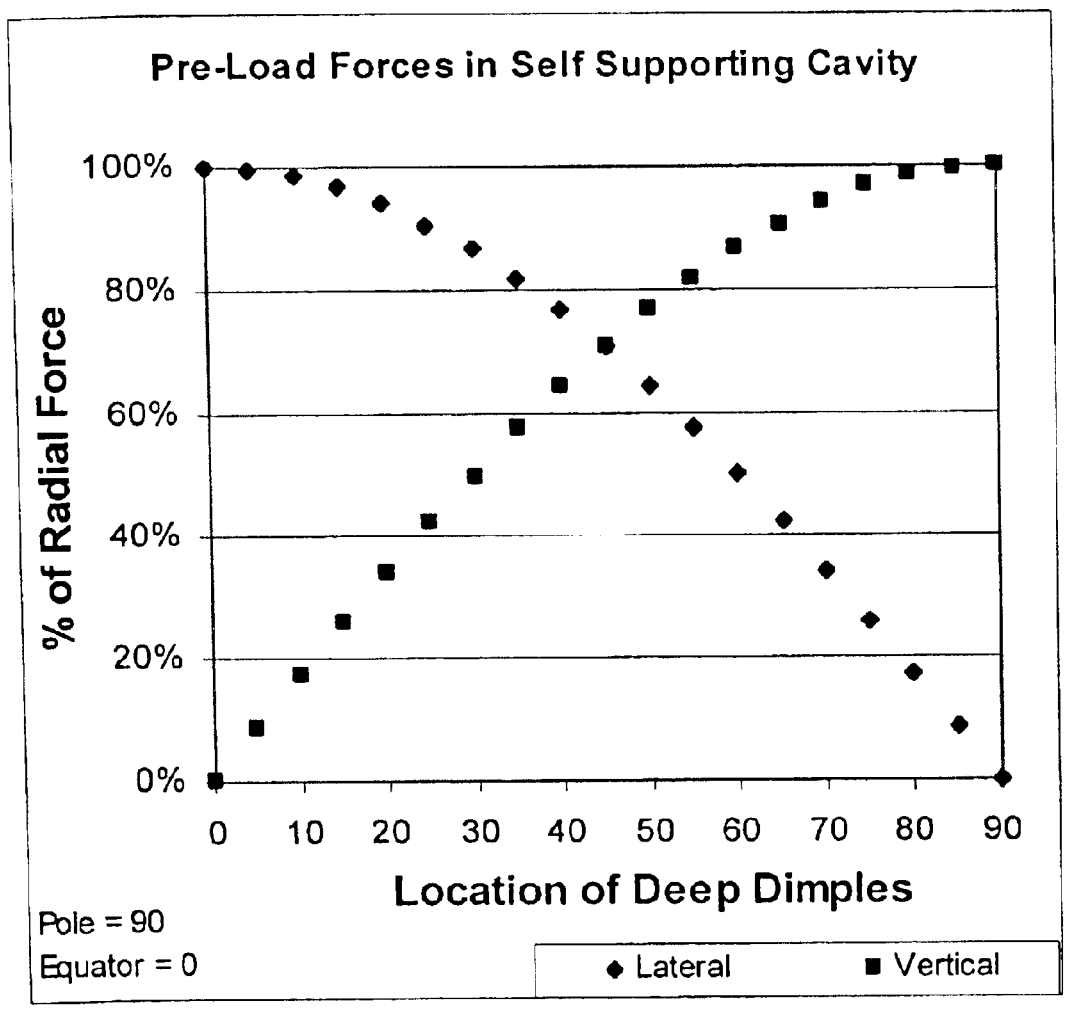
FIG. 13 is a graph illustrating the relationship between the location on a golf ball of certain dimples according to the invention and the resulting forces in a self-supporting cavity during molding.

FIG. 13 is a graph illustrating the relationship between the location of these deep dimples on a ball and the resulting force applied to the core. Table 1, set forth below lists the data that is illustrated graphically in FIG. 13.

TABLE 1

| Angle deg | Lateral % Radial | Vertical % Radial |
|---|---|---|
| 0 | 100% | 0% |
| 5 | 100% | 9% |
| 10 | 98% | 17% |
| 15 | 97% | 26% |
| 20 | 94% | 34% |
| 25 | 91% | 42% |
| 30 | 87% | 50% |
| 35 | 82% | 57% |
| 40 | 77% | 64% |
| 45 | 71% | 71% |
| 50 | 64% | 77% |
| 55 | 57% | 82% |
| 60 | 50% | 87% |
| 65 | 42% | 91% |
| 70 | 34% | 94% |
| 75 | 26% | 97% |
| 80 | 17% | 98% |
| 85 | 9% | 100% |
| 90 | 0% | 100% |

Notes
1. Cavity with no retractable core pins
2. Core is supported by 3 or more deep dimples that contact the core
3. Force is created by designing the deepest dimple to pre-load core slightly
4. The only force generated is in the radial direction (all force vectors pass through ball center)
5. Radial pre-load force is proportional to radial interference between deepest dimples & core
6. If core is undersized, there is no pre-load force
7. Friction is ignored.

In another preferred embodiment, the core or intermediate ball (core plus one or more mantle or inner cover layer(s)) is supported by one or more deep dimples (or rather the protrusions extending from the molding surface that form the deep dimples) that nearly contact or extend to the core. The deep dimple locations may be anywhere on the ball, such as at about 30 degrees latitude on each hemisphere, about 40 to 45 degrees latitude, about 50 to 60 degrees latitude, and the like. Preferably, the deep dimples are located at about 40 to 45 degrees latitude or more on each hemisphere. The number of deep dimples may vary as desired. Any number and pattern may be used, although a limited number in a specific geometric pattern is preferred.

The geometric pattern should preferably be approximately centered about the pole of the ball. It is not possible to exactly center the geometric pattern with some shapes, such as a triangle. Additionally, it may be desirable to shift the pattern slightly to accommodate different forces (due to the molding of the layer(s)) on different sides of the ball. This results in a finished ball where the deep dimples extend from the outer layer to the next inner layer or the core. As described above, multiple cover layers, of the same or different materials and thicknesses, may be added to the ball using this procedure.

Figure 14:
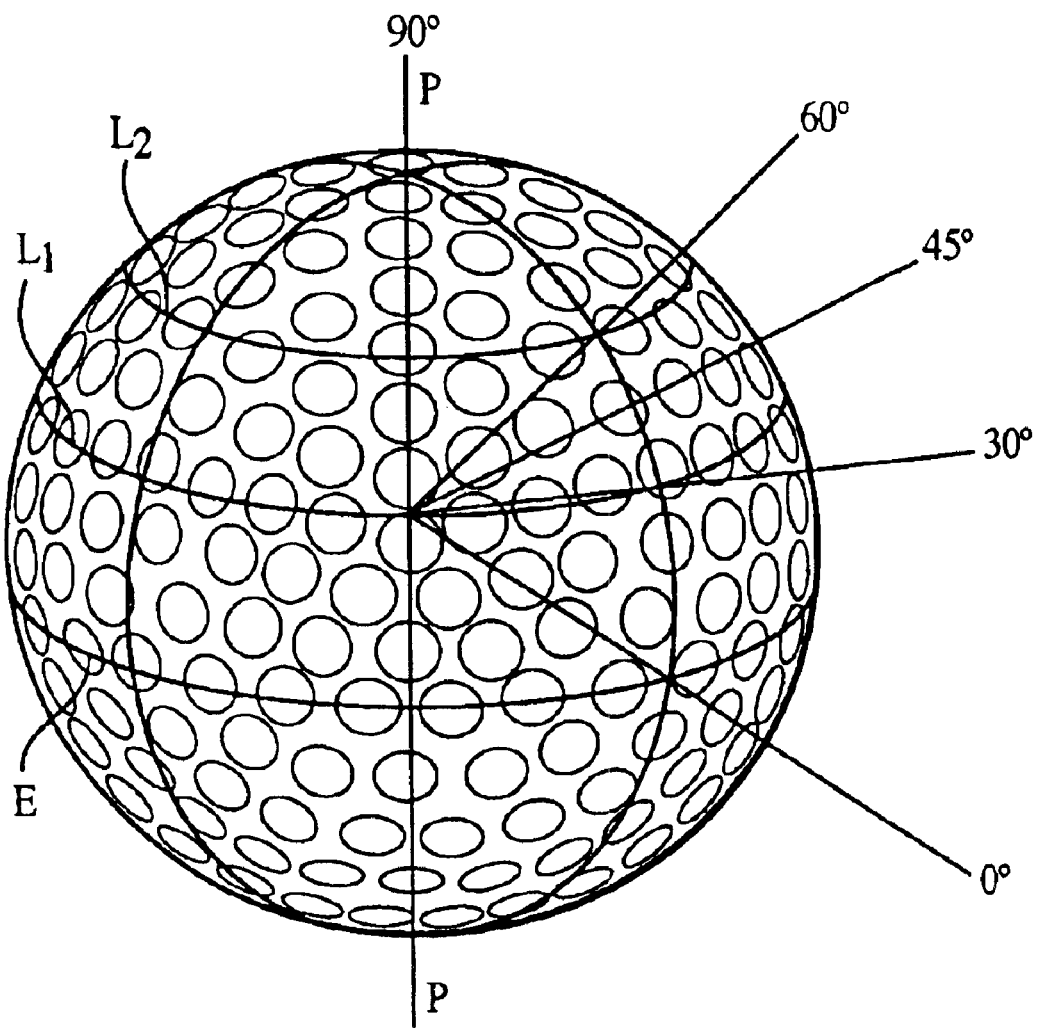
FIG. 14 is a perspective view of a golf ball illustrating a region defined along the outer surface of the ball.

FIG. 14 is a perspective view of a preferred embodiment golf ball according to the present invention. This illustration reveals a circumferential region defined along the outer surface of the ball. This region corresponds to the preferred location within which are defined one or more deep dimples as described herein. Specifically, the preferred location for the deep dimples is the region along the outer surface of the ball extending between about 30° latitude and about 60° latitude. The pole of the ball is an axis extending through the ball shown in FIG. 14 as line P—P. The equator is illustrated in FIG. 14 as a circumferential line E extending about the ball at a latitude of 0°.

Any number of cover and/or mantle layers may be used, and the deep dimples may extend into as many layers as desired. For example, a golf ball having a core and three cover layers (a first inner cover layer, a second inner cover layer, and an outer cover layer) may be produced according to the present invention. The deep dimples may extend to or through the first inner cover layer, through both the first inner layer and the second inner cover layer, or, the deep dimple may extend through all the cover layers to or into the core.

Additionally, if desired, the mantle layer could be colored or contain other visible or cosmetic features that could be seen through the cover layer. The cover layer may also be transparent, translucent or opaque if desired to enhance or highlight the mantle layer.

Other methods of molding golf balls without the use of core pins include the use of tabs on the equator of the core such that the dimpled cavity can receive the tabs to hold the core in place during molding of one or more layers about the core. Alternatively, the golf ball may be molded with a mantle having one or more keyways or openings. The cover mold would then be equipped with side pulls that engage the keys and hold the core in place. These techniques are explained in greater detail herein.

The core, preferably a solid core, for the ball is preferably about 1.2 to about 1.6 inches in diameter, although it may be possible to use cores in the range of about 1.0 to 2.0 inches. If the ball has a single cover layer, the core size may be up to about 1.660 inches.

The present invention includes one or more auxiliary layers disposed on the core, and preferably immediately adjacent to the outer core surface. For example, for some applications, it may be preferred to deposit a barrier coating that limits transmission of moisture to the core. As previously noted, such barrier coatings or layers are relatively thin. Generally, such coatings are at least 0.0001 inches, and preferably, at least 0.003 inches in thickness. Furthermore, an adhesion promoting layer may be used between the cover layers and/or the core, or the cover and core having a barrier coating disposed thereon. Such adhesion promoting layers are known in the art and may be used in combination with the inventive features described herein. See for example U.S. Pat. No. 5,820,488 herein incorporated by reference.

The inner cover layer that is molded over the core is preferably about 0.0005 inches to about 0.15 inches in thickness. The inner ball that includes the core and inner cover layer(s), or core for a two piece ball, preferably has a diameter in the range of 1.25 to 1.60 inches. The outer cover layer is about 0.0005 inches to about 0.15 inches thick. Together, the core, the inner cover layer(s) and the outer cover layer (or core and single cover layer) combine to form a ball having a diameter of 1.680 inches or more, the minimum diameter permitted by the rules of the U.S.G.A and weighing no more than 1.62 ounces. If desired, golf balls of different weights and diameters may also be formed if the rules of the U.S.G.A. are not an issue.

In a particularly preferred embodiment of the invention, the golf ball has a dimple pattern that provides dimple coverage of 65% or more, preferably 75% or more, and more preferably about 80 to 85% or more. In a preferred embodiment of the invention, there are from 300 to less than 500 dimples, preferably from about 340 to about 440 dimples.

Specifically, the arrangement and total number of dimples are not critical and may be properly selected within ranges that are well known. For example, the dimple arrangement may be an octahedral, dodecahedral or icosahedral arrangement. The total number of dimples is generally from about 250 to about 600, and especially from about 300 to about 500.

In a preferred embodiment, the golf ball typically is coated with a durable, abrasion-resistant, relatively non-yellowing finish coat or coats if necessary. The finish coat or coats may have some optical brightener and/or pigment added to improve the brightness of the finished golf ball. In a preferred embodiment, from 0.001 to about 10% optical brightener may be added to one or more of the finish coatings. If desired, optical brightener may also be added to the cover materials. One type of preferred finish coatings are solvent based urethane coatings known in the art. It is also contemplated to provide a transparent outer coating or layer on the final finished golf ball.

Golf balls also typically include logos and other markings printed onto the dimpled spherical surface of the ball. Paint, typically clear paint, is applied for the purposes of protecting the cover and improving the outer appearance before the ball is completed as a commercial product. FIG. 11 is a fragmental enlarged view showing the radial cross-sectional shape of a dimple formed in the surface of a golf ball prior to paint coating. Most often, the dimple is circular in plane shape. In general, dimples such as the deep dimple shown in FIG. 11, are formed in a golf ball surface as a recess or indentation. The cross-sectional shape of a dimple is defined by a portion of a curved surface such as a circle, ellipse, or hyper ellipse. For example, the cross-sectional shape of the dimple in FIG. 11 is a portion of a circle. The dimple is circumscribed by an upper edge, which is continuously connected to a land area of the outer surface of the golf ball where no dimples are formed. The edge is generally beveled from the land area as a steep slope to form the dimple. The edge is generally initially angular prior to paint coating and somewhat rounded after paint coating.

The various cover composition layers of the present invention may be produced according to conventional melt blending procedures or any other method known in the art. For example, the cover materials may be blended in a Banbury® type mixer, two-roll mill, or extruder prior to neutralization. After blending, neutralization then occurs in the melt or molten state in the Banbury® mixer. The blended composition is then formed into slabs, pellets, etc., and maintained in such a state until molding is desired. Alternatively, a simple dry blend of the pelletized or granulated materials (which have previously been neutralized to a desired extent, if applicable) and colored master batch may be prepared and fed directly into the injection molding machine where homogenization occurs in the mixing section of the barrel prior to injection into the mold. If necessary, further additives such as an inorganic filler, etc., may be added and uniformly mixed before initiation of the molding process.

The golf balls of the present invention can be produced by molding processes, which include, but are not limited to, those which are currently well known in the golf ball art. As mentioned above, the golf balls can be produced, for example, by injection molding, reaction injection molding (RIM), liquid injection molding, compression molding, and the like, the novel cover compositions around a wound, solid, or other type of core to produce an inner ball which typically has a diameter of about 1.50 to 1.67 inches.

Alternatively, the cover layer(s) may be cast around the core or core and inner layer(s), such as in a cast polyurethane system. The outer layer is subsequently molded over the inner layer to produce a golf ball having a diameter of 1.620 inches or more, preferably about 1.680 inches or more. Although any type of core, such as either solid cores or wound cores can be used in the present invention, as a result of their lower cost and superior performance, solid molded cores are preferred over wound cores. The standards for both the minimum diameter and maximum weight of the balls are established by the United States Golf Association (U.S.G.A.), but not all golf balls are designed to meet these standards.

In compression molding, smooth surfaced hemispherical shells (previously molded) are positioned around the core in a mold having the desired inner cover thickness. The core and shells are then subjected to compression molding at about 200° F. to 300° F. for about 2 to 10 minutes, followed by cooling at 50° F. to 70° F. for about 2 to 7 minutes to fuse the shells together to form a unitary intermediate ball. In addition, the intermediate balls may be produced by injection molding wherein the inner cover layer is injected directly around the core placed at the center of an intermediate ball mold for a period of time in a mold temperature of from 50° F. to about 100° F. Subsequently, the outer cover layer is molded about the core and the inner layer by similar molding techniques to form a dimpled golf ball of a diameter of 1.680 inches or more. To improve the adhesion between the inner cover-layer and the outer cover layer, or any of the cover layers and/or the core, an adhesion promoter may be used. Some adhesion promoters, such as abrasion of the surface, corona treatment, and the like, are known in the art. A preferred adhesion promoter is a chemical adhesion promoter, such as a silane or other silicon compound, preferably N-(2-aminoethyl-3)-aminopropyltrimethoxysilane. The intermediate golf ball (core and inner cover layer) may be dipped or sprayed with the chemical, and then the outer cover layer is formed over the treated inner cover layer. For multiple cover layers, the ball may be treated more than once if necessary or desired.

A typical process for casting covers around a core or core and inner layer(s) comprises two part (for example, bookcase type) molds that are heated to approximately 80 to 180° F. The cover material, such as a polyurethane, is heated to approximately 80 to 180° F. The material gel time is approximately 20 to 90 seconds, and mold closure time (heat step) is approximately 2 to 8 minutes, and the cooling step is approximately 2 to 8 minutes. After the material forms a cover, the molds are opened, and the balls are removed from the molds. The cavities may optionally be cleaned and/or coated with a mold release before the process is repeated.

Figure 15:
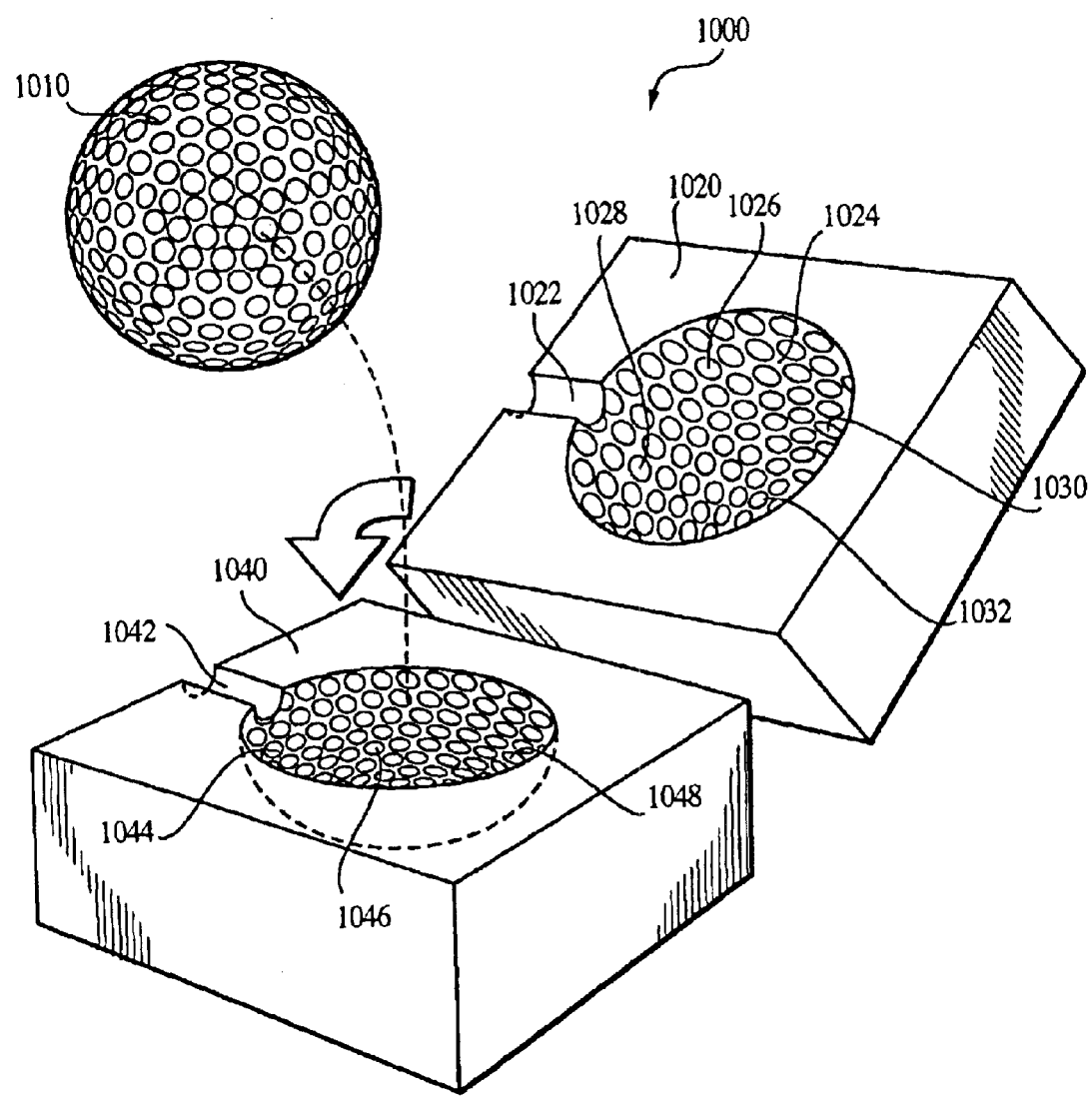
FIG. 15 is a schematic view of a preferred embodiment molding assembly and a golf ball core according to the present invention.

FIG. 15 illustrates a preferred embodiment molding apparatus 1000 in accordance with the present invention. Molding apparatus 1000 comprises two mold halves 1020 and 1040 that each define a hemispherical portion of a molding chamber 1024 and 1044. Defined along the outer surface of the hemispherical portion of the molding chamber 1024, are a plurality of raised regions or protrusions 1032. These raised regions form conventional dimples in a cover layer in a golf ball formed using molding apparatus 1000. Also provided along the outer surface of the hemispherical molding chamber 1024 are a plurality of outwardly extending raised regions, protrusions, or support pins 1026, 1028, and 1030. These raised regions are of a height greater than the height of the raised regions 1032. Specifically, the raised regions 1026, 1028, and 1030 form deep dimples as described herein. These raised regions are used to retain and support a golf ball core or intermediate ball assembly placed in the mold. After molding a cover layer on the core or ball assembly, a final golf ball 1010 is produced. A ball 1010 illustrated in FIG. 15 is depicted with a plurality of dimples or dimple portions formed along its outer surface. The ball also includes a plurality of deep dimples along its outer surface resulting from the raised regions 1026, 1028, and 1030. These deep dimples may correspond to a dimple such as item 240 in FIG. 5. A passage 1022 is provided in the mold half 1020. The passage 1022 provides communication and a path for a flowable moldable material to be introduced into the molding chamber. The molding apparatus 1000 also includes a second molding portion or plate 1040. The plate 1040 defines a hemispherical molding chamber 1044 also having a plurality of raised regions, protrusions, or support pins along its outer surface. Specifically, raised regions 1046 and 1048 are provided similar to the previously described raised regions 1026, 1028, and 1030. The molding plate 1040 also defines a channel 1042 extending from the molding chamber 1044 to the exterior of the plate. Most preferably, the molding channel 1042 is aligned with channel 1022 in the other plate 1020 when the mold is closed to provide a unitary passage providing communication between the molding chamber and the exterior of the mold. A golf ball core or intermediate ball assembly placed in the molding chamber 1020,1040 is supported by the various raised regions 1026, 1028, 1030, 1046, and 1048 as previously described. A golf ball 1010 or ball component is produced.

It will be appreciated that the present invention includes a molding process, molding equipment, and the resulting molded golf balls and components thereof from utilizing a molding chamber in which most or all of the dimples that are formed in the ball are deep dimples and thus, extend into or through an underlying layer. For instance, in this embodiment, the raised regions or protrusions 1032 defined in the molding chamber 1024 in FIG. 15, would all form deep dimples. And, the set of raised protrusions or support pins 1026, 1028, and 1030 would have a height greater than the height of the protrusions 1032. And so, the deep dimples formed from support pins 1026, 1028 and 1030 would have a depth greater than the other population of deep dimples, i.e. those formed from the protrusions 1032. A similar configuration would be utilized for the molding chamber 1044.

Additionally, golf balls of the present invention that comprise polyurethane/polyurea (or other suitable materials) in any of the inner and outer cover layer may be produced by a reaction injection molding process (RIM), as previously described.

Golf balls and, more specifically, cover layers formed by RIM are preferably formed by the process described in application Ser. No. 09/040,798, filed Mar. 18, 1998, incorporated herein by reference, or by a similar RIM process.

RIM differs from non-reaction injection molding in a number of ways. The main distinction is that in RIM a chemical reaction takes place in the mold to transform a monomer or adducts to polymers and the components are in liquid form. Thus, a RIM mold need not be made to withstand the pressures that occur in conventional injection molding.

In contrast, injection molding is conducted at high molding pressures in the mold cavity by melting a solid resin and conveying it into a mold, with the molten resin often being at about 150 to about 350° C. At this elevated temperature, the viscosity of the molten resin usually is in the range of about 50,000 to about 1,000,000 centipoise, and is typically around 200,000 centipoise. In an injection molding process, the solidification of the resins occurs after about 10 to about 90 seconds, depending upon the size of the molded product, the temperature and heat transfer conditions, and the hardness of the injection molded material. Subsequently, the molded product is removed from the mold. There is no significant chemical reaction taking place in an injection molding process when the thermoplastic resin is introduced into the mold.

In contrast, in a RIM process, the chemical reaction causes the material to set in less than about 5 minutes, often in less than 2 minutes, preferably in less than one minute, more preferably in less than 30 seconds, and in many cases in about 10 seconds or less.

Catalysts can be added to the RIM polyurethane system starting materials as long as the catalysts generally do not react with the constituent with which they are combined. Suitable catalysts include those which are known to be useful with polyurethanes and polyureas.

The polyol component typically contains additives, such as stabilizers, flow modifiers, catalysts, combustion modifiers, blowing agents, fillers, pigments, optical brighteners, and release agents to modify physical characteristics of the cover. Recycled polyurethane/polyurea also can be added to the core. Polyurethane/polyurea constituent molecules that were derived from recycled polyurethane can be added in the polyol component.

In accordance with one aspect of the present invention, the mold cavity preferably contains nonretractable support pins and is generally constructed in the same manner as a mold cavity used to injection mold a thermoplastic, for example, ionomeric golf ball cover. However, two differences when RIM is used are that tighter pin tolerances generally are required, and a lower injection pressure is used. Also, the molds can be produced from lower strength material such as aluminum. As described herein, in another aspect of the invention, the mold cavity may contain one or more selectively positionable, i.e. retractable, pins disposed about the molding cavity.

RIM may provide for improved cover layers. If plastic products are produced by combining components that are preformed to some extent, subsequent failure can occur at a location on the cover which is along the seam or parting line of the mold, as well as at core pin locations, because these regions are intrinsically different from the remainder of the cover layer and can be weaker or more stressed. Cover layers produced via RIM are believed to provide for improved durability of a golf ball cover layer by providing a uniform or "seamless" cover in which the properties of the cover material in the region along the parting line are generally the same as the properties of the cover material at other locations on the cover, including at the poles. The improvement in durability is believed to be a result of the fact that the reaction mixture is distributed uniformly into a closed mold. This uniform distribution of the injected materials reduced or eliminates knit-lines and other molding deficiencies which can be caused by temperature differences and/or reaction differences in the injected materials. RIM typically results in generally uniform molecular structure, density and stress distribution as compared to conventional injection-molding processes.

The golf balls, and particularly the cover layer(s), of the present invention may also be formed by liquid injection molding (LIM) techniques, or any other method known in the art.

The golf balls formed according to the present invention can be coated using a conventional two-component spray coating or can be coated during the RIM process, for example, using an in-mold coating process.

Figure 16:
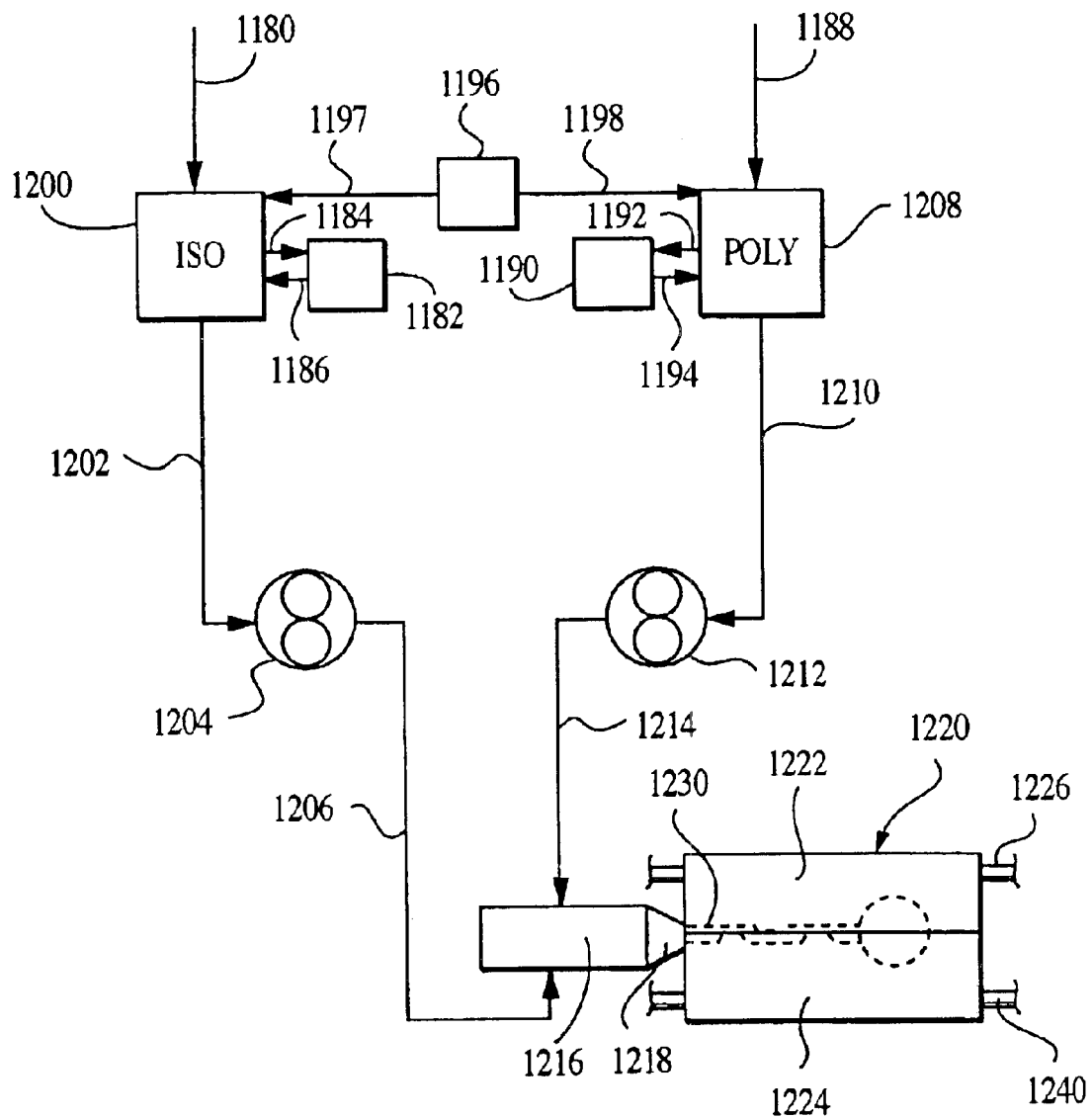
FIG. 16 is a process flow diagram that schematically depicts a reaction injection molding process according to the invention.

Referring next to FIG. 16, a process flow diagram for forming a RIM cover of polyurethane is shown. Isocyanate from bulk storage is fed through line 1180 to an isocyanate tank 1200. The isocyanate is heated to the desired temperature, e.g., 90° F. to about 170° F., by circulating it through heat exchanger 1182 via lines 1184 and 1186. Polyol, polyamine, or another compound with an active hydrogen atom is conveyed from bulk storage to a polyol tank 1208 via line 1188. The polyol is heated to the desired temperature, e.g., 90° F. to about 170° F., by circulating it through heat exchanger 1190 via lines 1192 and 1194. Dry nitrogen gas is fed from nitrogen tank 1196 to isocyanate tank 1200 via line 1197 and to polyol tank 1208 via line 1198. Isocyanate is fed from isocyanate tank 1200 via line 1202 through a metering cylinder or metering pump 1204 into recirculation mix head inlet line 1206. Polyol is fed from polyol tank 1208 via line 1210 through a metering cylinder or metering pump 1212 into a recirculation mix head inlet line 1214. The recirculation mix head 1216 receives isocyanate and polyol, mixes them, and provides for them to be fed through nozzle 1218 into injection mold 1220. The injection mold 1220 has a top mold 1222 and a bottom mold 1224. Coolant flows through cooling lines 1226 in the top mold 1222 and lines 1240 in the bottom mold 1224. The materials are kept under controlled temperature conditions to insure that the desired reaction profile is maintained.

The polyol component typically contains additives, such as stabilizers, flow modifiers, catalysts, combustion modifiers, blowing agents, fillers, pigments, optical brighteners, and release agents to modify physical characteristics of the cover. Recycled polyurethane/polyurea also can be added to the core. Polyurethane/polyurea constituent molecules that were derived from recycled polyurethane can be added in the polyol component.

Inside the mix head 1216, injector nozzles impinge the isocyanate and polyol at ultra-high velocity to provide excellent mixing. Additional mixing preferably is conducted using an aftermixer 1230, which typically is constructed inside the mold between the mix head and the mold cavity.

Figure 17:
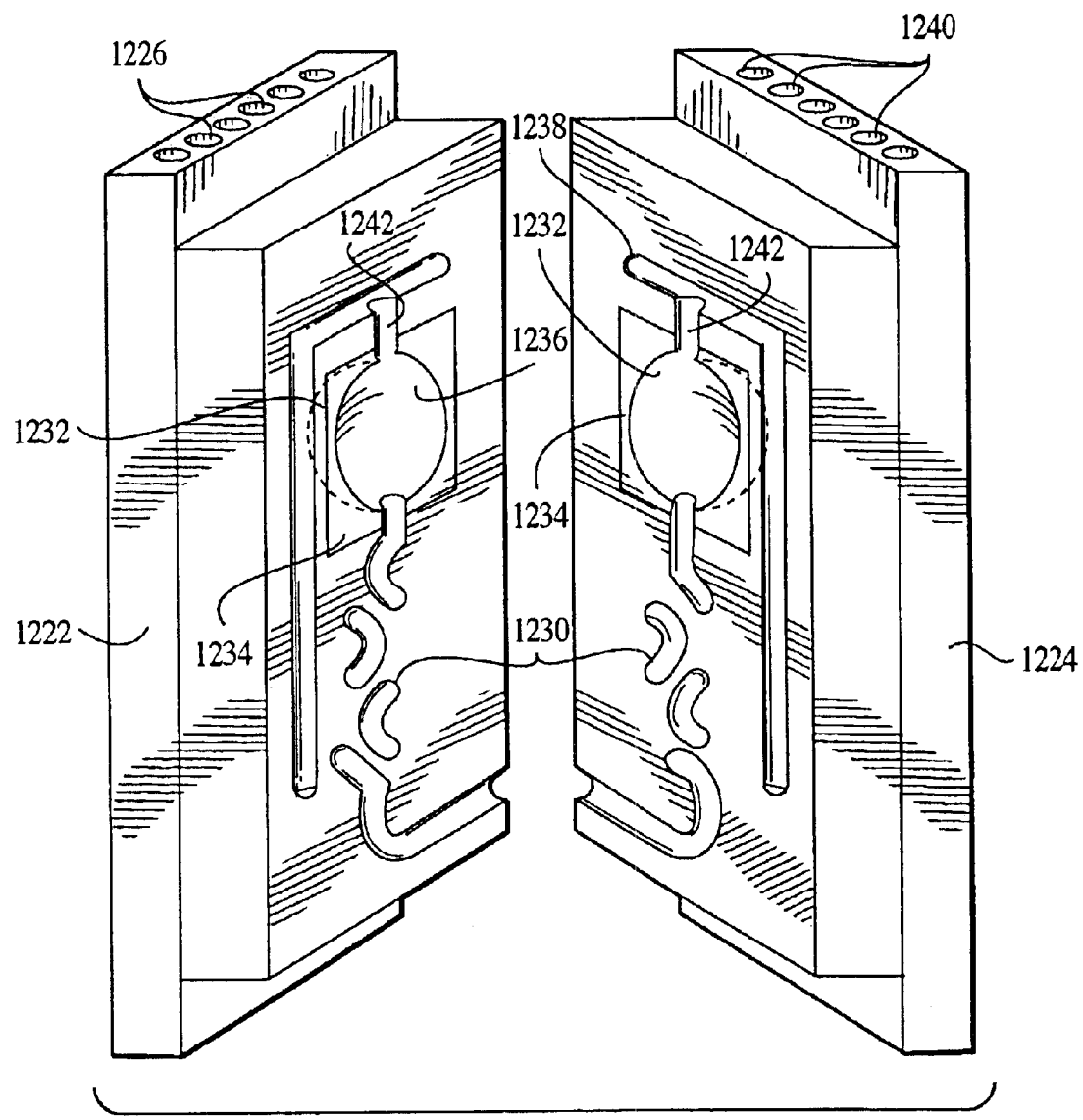
FIG. 17 schematically shows a mold for reaction injection molding a golf ball cover according to the invention.

As is shown in FIG. 17, a mold includes a golf ball cavity chamber 1232 in which a spherical golf ball mold 1234 with a dimpled, spherical mold cavity 1236 defined. The mold cavity 1236 is preferably provided with a plurality of raised regions that form deep dimples as described herein, and which may also be utilized as one or more nonretractable support pins, as shown and described with regard to FIG. 15. The aftermixer 1230 can be a peanut aftermixer, as in shown in FIG. 17, or in some cases another suitable type, such as a heart, harp or dipper. An overflow channel 1238 receives overflow material from the golf ball mold 1234 through a shallow vent 1242. Heating/cooling passages 1226 and 1240, which preferably are in a parallel flow arrangement, carry heat transfer fluids such as water, oil, etc. through the top mold 1222 and the bottom mold 1224. It will be appreciated that the molding apparatus illustrated in FIG. 15 may be used in conjunction with a RIM process by providing a mixer, i.e. aftermixer 1230 of FIG. 17, in the molds 1020 and 1040.

The present invention also provides a technique and molding configuration particularly well suited for automated production and high efficiency manufacturing. In a preferred embodiment, a molding apparatus is provided that includes a mold having one or more outwardly extending projections that form recessed regions along the perimeter of the molded component. Most preferably, the resulting recesses are located along the equator of the resulting golf ball or component thereof. This configuration enables the molded part to be easily removed from a mold, and to be accurately positioned in another mold. That is, mechanical positioning members may readily grasp the intermediate molded ball by engagement in the recessed regions and remove the molded ball or intermediate ball from the mold. The molded component may also be accurately and consistently positioned in a subsequent molding chamber. This configuration also results in any flash or witness lines from molding a layer on the intermediate component having the recesses, to extend only along the parting line. Accordingly, since the flash is along the equator, known finishing processes may be used to remove the flash or markings. This molding configuration and technique is readily applicable to RIM techniques, and also to techniques for forming deep dimples as described herein. Most preferably, this technique is preferred when forming a mantle layer or other intermediate layer of a golf ball.

Figure 18:
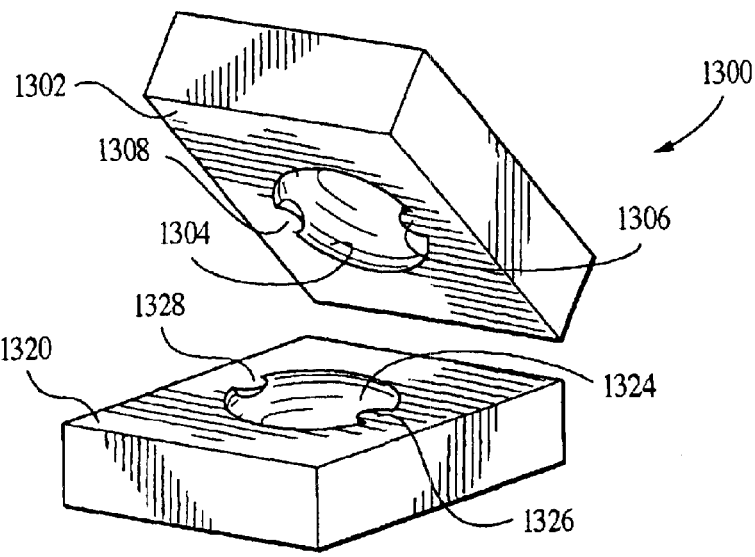
FIG. 18 is a perspective view of a preferred embodiment molding apparatus according to an aspect of the present invention.
Figure 19:
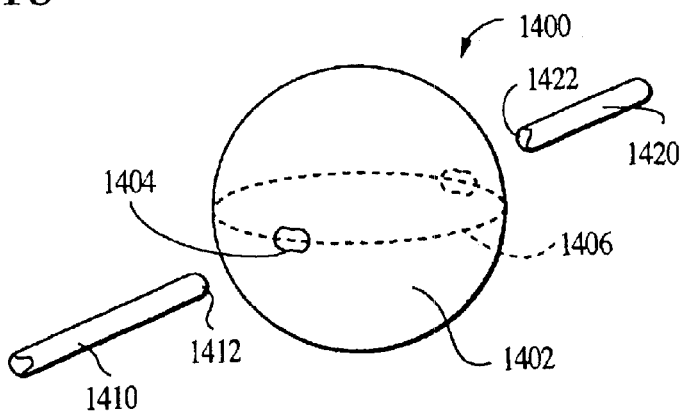
FIG. 19 is another view of an intermediate ball molded in accordance with an aspect of the present invention.
Figure 20:
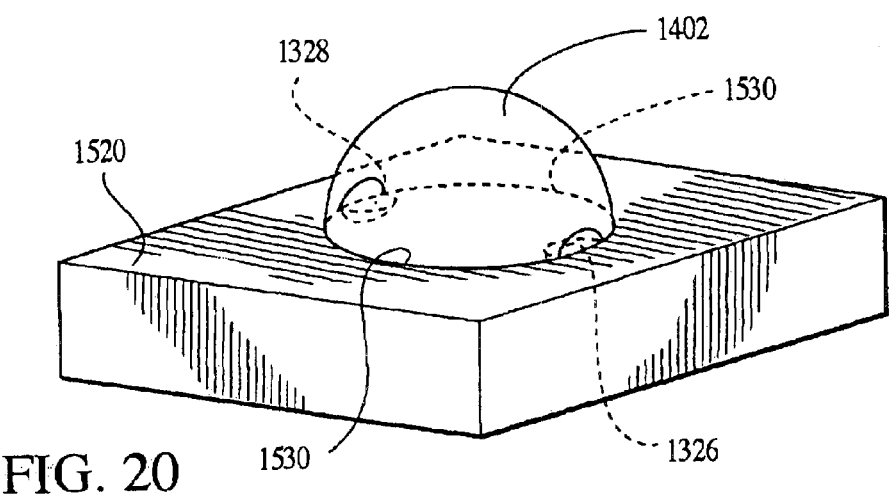
FIG. 20 is a view of a lower portion of the molding assembly illustrated in FIG. 18 containing an intermediate ball shown in FIG. 19.

FIGS. 18 to 20 illustrate an aspect of the present invention which facilitates manufacture of a golf ball in accordance with the present invention. Specifically, FIG. 18 illustrates a preferred embodiment molding chamber in accordance with this aspect of the present invention. The preferred embodiment molding chamber 1300 comprises a lower mold 1320 and an upper mold 1302. The upper mold 1302 defines a semi-circular concave molding surface 1304. Defined along the molding surface 1304 are a plurality of outwardly extending edge projections such as 1306 and 1308 shown in FIG. 18. Similarly, the lower mold 1320 defines a hemispherical molding surface 1324 having one or more outwardly extending edge projections 1326 and 1328. The molding surfaces 1304 and 1324 may further define a plurality of raised regions that form deep dimples as described herein, and which may further serve as nonretractable support pins as described herein. The outwardly extending edge projections 1306 and 1308 are located along an edge that extends between the hemispherical molding surface 1304 and the relatively flat mating surface of the upper mold 1302 that contacts the mating surface of the lower mold 1320 when the molds are closed or placed in a molding configuration. This interface between the two molds is often referred to in the industry as a "parting line." Similarly, the outwardly extending projections 1326 and 1328 are located along an edge that extends between the hemispherical molding surface 1324 and the relatively flat mating surface of the lower mold. Preferably, when the upper mold 1302 and the lower mold 1320 are closed, the edge projection 1308 is aligned with the edge projection 1328. And, the edge projection 1306 is aligned with the edge projection 1326.

FIG. 19 illustrates an assembly 1400 of an intermediate molded ball 1402 and a plurality of mechanical engagement members adapted to engage and position the ball 1402 as desired. The engagement members 1410 and 1420 each have distal ends 1412 and 1422, respectively, that are sized and shaped to fit within and engage recessed regions such as 1404 defined along the outer surface of the ball 1402. As will be understood, the recessed regions 1404 result from the outward edge projections such as 1328 and 1308 of the molding assembly 1300 shown in FIG. 18. Furthermore, it will be appreciated that, in the preferred embodiment, the resulting recessed regions such as 1404 lie along an equator 1406 of the ball 1402.

FIG. 20 is a detailed view of a lower mold 1520 that is adapted to form an outer layer, preferably an outer cover layer on the intermediate ball 1402. Accordingly, the diameter of the molding surface defined in the mold 1520 is slightly larger than the outermost diameter of the ball 1402. The ball is preferably positioned within the lower mold 1520 by use of the mechanical members 1410 and 1420 that position the ball such that the equator 1406 extends preferably closely along the outer molding edge 1530 of the lower mold 1520. It will be appreciated that a corresponding upper mold (not shown) is used in conjunction with the lower mold 1520. Further, it will be understood that the molding surface defined in the lower mold is preferably provided with a plurality of raised regions that form deep dimples, or which serve as nonretractable support pins as previously described herein.

The present invention also provides equipment and techniques for forming golf ball cover layer(s) independently of golf ball cores or intermediate ball assemblies. That is, cover layers may be formed which are not initially retained or formed on an underlying core or intermediate ball assembly. The cover layer is preferably formed in two hemispherical shell portions that together form a cover layer. This strategy provides increased flexibility in production and manufacturing in addition to other benefits described herein. The equipment and techniques described herein are particularly well suited for use with RIM processes. Related to this, the invention also provides equipment and techniques for eliminating any seams otherwise resulting when cover layer portions or shells are molded onto or about a core or intermediate ball assembly.

Figure 21:
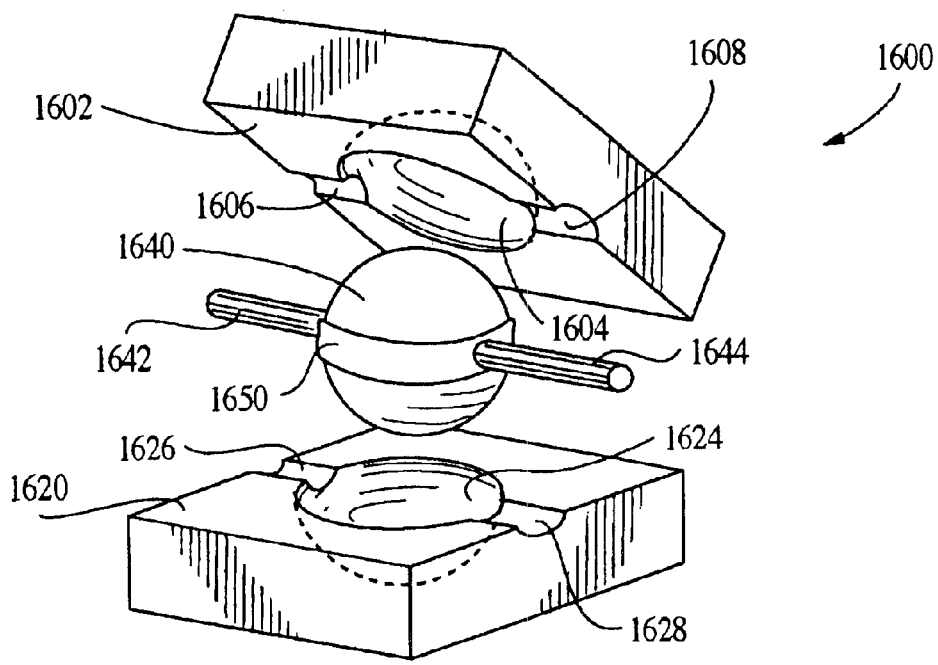
FIG. 21 is a perspective view of another preferred embodiment molding apparatus according to the present invention.

FIG. 21 is a perspective view of another preferred embodiment molding apparatus according to the present invention. FIG. 21 illustrates a preferred embodiment molding apparatus 1600 comprising an upper mold 1602 and a lower mold 1620. The upper mold 1602 defines a hemispherical molding surface 1604. One or more conduits or passageways 1606 and 1608 are provided in the upper mold 1602 so as to enable the introduction of flowable material or molding material into the molding chamber defined partially by the molding surface 1604. The lower mold 1620 also defines a hemispherical molding surface 1624 having entryways or passages 1626 and 1628 as shown. The upper and lower molds 1602 and 1620 are sized and shaped such that when closed and placed in abutting relationship to one another, the two hemispherical molding surfaces 1604 and 1624 together define a spherical molding chamber suitable for molding golf balls or components thereof.

Additionally, it will be understood that in accordance with the present invention, the molding surfaces 1604 and 1624 are provided with a plurality of raised regions that form deep dimples in the resulting molded ball. Furthermore, a set of raised regions may be provided along the molding surfaces that serve as nonretractable support pins. Moreover, in accordance with another aspect of the present invention, the passages 1606, 1608, 1626, and 1628 may be provided in the form of a mixer such as after mixer 1230 shown in FIG. 17 if a RIM process is used.

The molding assembly 1600 also comprises a mandrel 1640 having a medially disposed spherical portion and laterally extending projections 1642 and 1644. The mandrel 1640 also provides a circumferential belt or lip 1650 extending about the periphery and preferably the equator of the spherical portion of the mandrel 1640. The mandrel, and particularly the spherical portion of the mandrel 1640 is sized such that it may be received within the two hemispherical molding surfaces as shown in FIG. 22.

Figure 22:
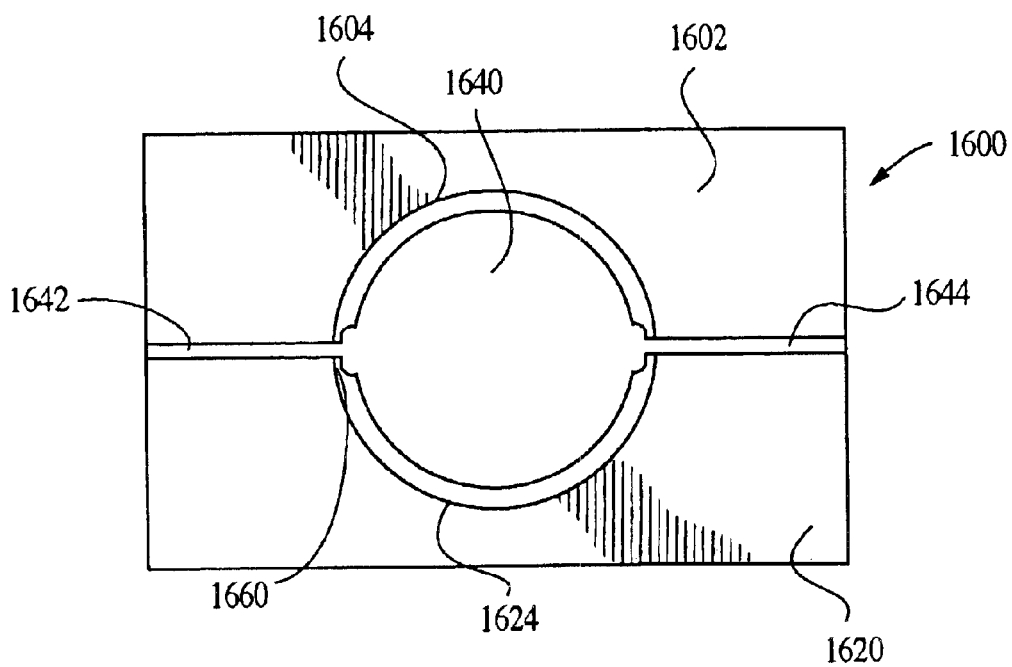
FIG. 22 is a schematic cross-sectional view of the molding apparatus depicted in FIG. 21 in a closed position.

Specifically, FIG. 22 illustrates the mandrel 1640 situated or positioned within the molding chamber defined by the upper mold 1602 and the lower mold 1620. It is preferred that the circumferential belt or lip 1650 of the mandrel is oriented to generally extend within the same plane or orientation as the circular interface between the upper and lower molds 1602 and 1620, when such molds are "closed" or placed in a molding configuration. It will be noted that a space or void is defined between the outer surface of the spherical portion of the mandrel 1640 and the upper molding surface 1604 and the lower molding surface 1624. As explained in greater detail herein, that space or void receives molding material which subsequently forms the component or layer as desired for the golf ball.

In the molding configuration illustrated in FIG. 22, a flowable molding material is introduced into the void defined between the outer spherical surface of the mandrel 1640 and the upper and lower molding surfaces 1604 and 1624, respectively. Upon hardening and/or curing of this material a cover layer is formed. As explained below, in order to form a golf ball, the mandrel is removed from the assembly and an appropriately sized core or intermediate ball assembly is positioned between the molds.

Figure 23:
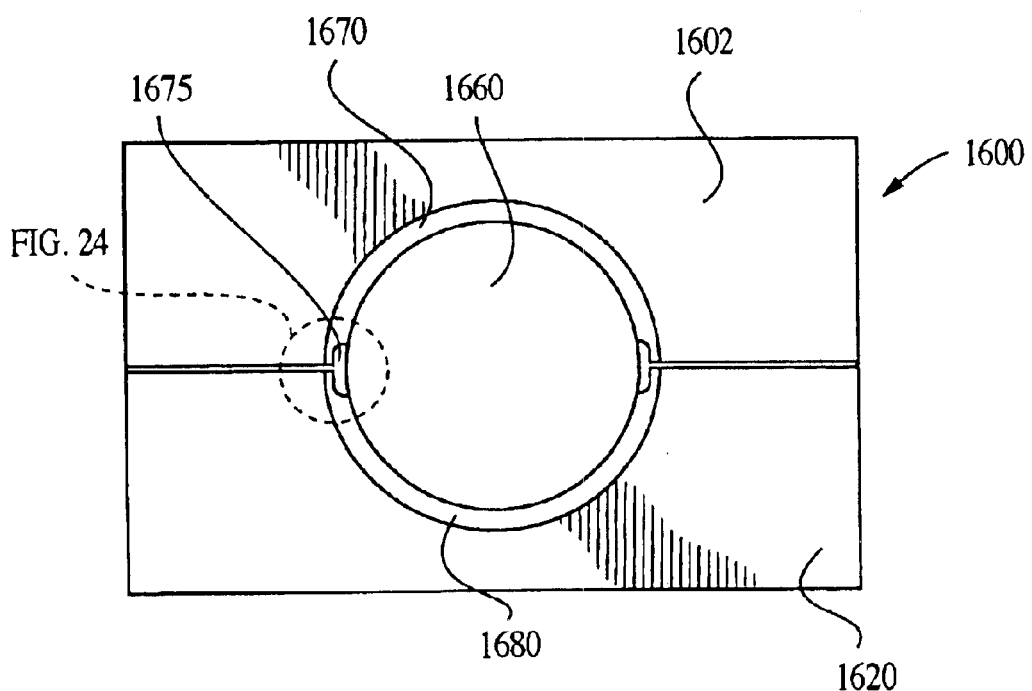
FIG. 23 is a schematic cross-sectional view of the molding apparatus depicted in FIG. 21 containing a golf ball core around which a layer is molded.
Figure 24:
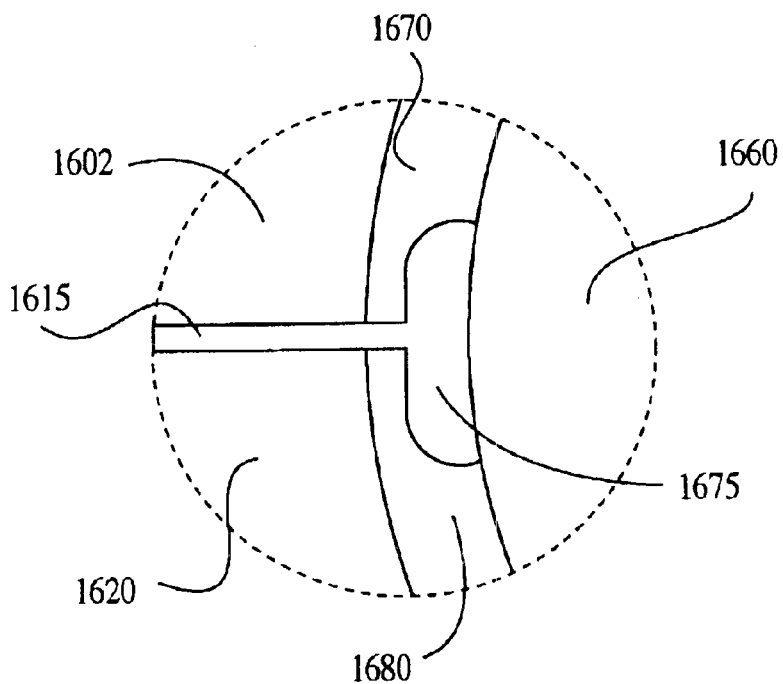
FIG. 24 is a detailed view of a portion of the cross-sectional view illustrated in FIG. 23.

FIG. 23 illustrates the molding assembly 1600 after the mandrel 1640 has been removed and a golf ball core or intermediate ball 1660 has been placed within the spherical molding chamber. At this juncture, a flowable molding material has been introduced into the mold to form shell-like or layered regions 1670 and 1680 along the upper and lower molding surfaces 1604 and 1624, respectively. The core is placed between these two cover layer shells 1670 and 1680. As will be appreciated, since the mandrel, having the equator lip region 1650, as best shown in FIG. 21, has been removed after molding the layered 1670 and 1680 components, a void or space 1675 is left. This is illustrated in greater detail in FIG. 24. A second molding operation is then performed in which flowable molding material is introduced through passageway 1615 defined within the molding apparatus. The second molding operation in which the void 1675 is filled further bonds the two cover layer shells 1670 and 1680 together. This second molding operation may be performed by a RIM operation, and has surprisingly been found to eliminate or significantly reduce the appearance of any seams along the outer surface of the ball.

It is also contemplated that instead of using a mandrel when forming the cover layer or portions thereof, a golf ball core or intermediate ball assembly could be used and retained in place with a cup or lid assembly. Specifically, in this variation of the invention, one-half of a cover assembly is molded onto a core or ball assembly by using only one mold, such as either the upper mold 1602 or the lower mold 1620. The core is placed in the hemispherical molding region of the mold and a cup or "jig" is used that fits over the core and molding region, i.e. one-half of the spherical molding chamber that would otherwise exist if both upper and lower molds were used. The cup or jig creates a closed molding chamber and assists in properly centering and positioning the core within the resulting chamber. The cup or jig may use a suction gripping system to secure the cup or jig to the mold and/or the core. After molding the one-half cover shell on the core, the cup is removed and the ball assembly may be removed from the mold, or more preferably, the other corresponding mold is positioned with the ball assembly and the remaining cover portion may be formed thereon.

As previously noted, the present invention includes embodiments in which a molding apparatus provides one or more selectively positionable, i.e. retractable and extendible, "knock-out" pins along the surface of the molding chamber. These pins are specially tailored such that after their retraction after a molding operation, the resulting voids are deep dimples. The pins extend into the molding chamber within specific ranges of dimensions. The pins are also sized such that the resulting voids have the desired diameters, spans, and shapes. The one or more "knock-out" pins may preferably be used in conjunction with the previously described raised protuberances that also form deep dimples. These aspects are as follows.

Figure 25:
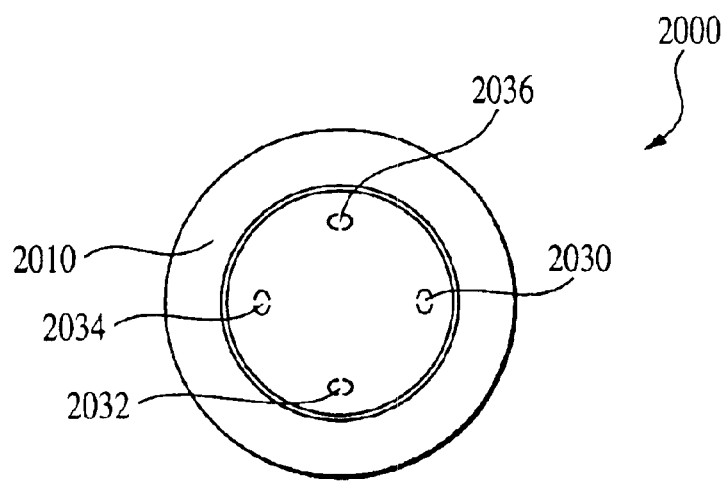
FIG. 25 is a schematic top view of a preferred embodiment molding apparatus according to the present invention.
Figure 26:
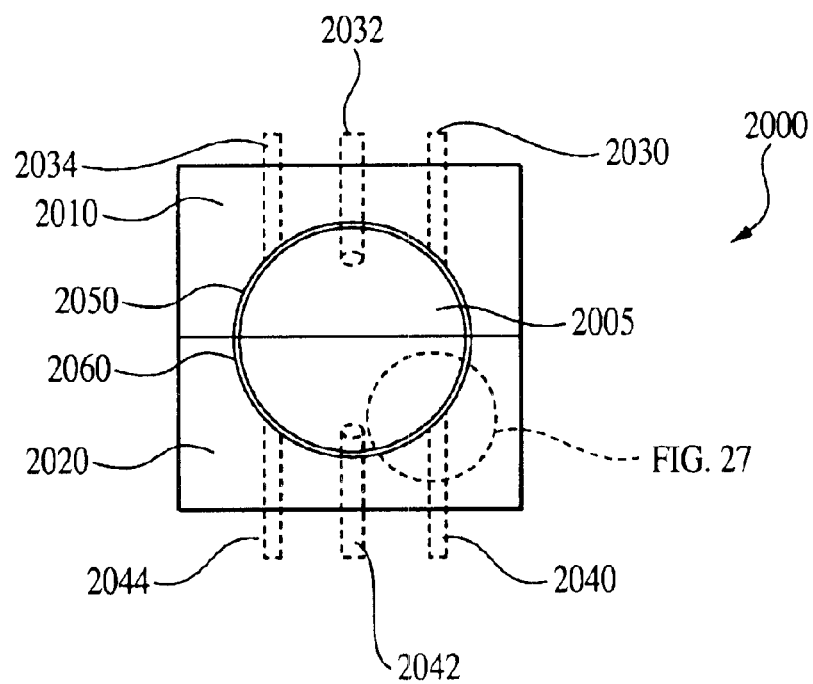
FIG. 26 is a schematic side view of the preferred embodiment molding apparatus shown in FIG. 25.

FIG. 25 is a schematic top view of another preferred embodiment molding apparatus 2000 according to the present invention. FIG. 26 is a schematic side view of the preferred embodiment molding apparatus 2000 shown in FIG. 25. The molding apparatus 2000 comprises an upper mold half 2010 and a lower mold half 2020. Each molding portion defines a hemispherical molding cavity defined by molding surfaces 2050 and 2060. The upper molding component 2010 includes a plurality and preferably four, apertures or passages within which are movably retained, four knock-out pins 2030, 2032, 2034, and 2036. Similarly, the lower molding component 2020 defines a plurality and preferably four, apertures or passages within which are movably retained a corresponding number of knock-out pins 2040, 2042, 2044, and 2046 (not shown). It will be appreciated that any number of pins may be used in each mold, such as 1–10, 1–6, 2–5, 2–4, or 3. These knock-out pins are movable within each of their respective apertures or guide channels. Upon molding, a golf ball core 2005 or other intermediate ball assembly is placed within the spherical molding chamber created by hemispherical molding surfaces 2050 and 2060 defined in the upper and lower molding components 2010 and 2020 as shown in FIG. 26. The core and/or ball assembly is sized such that its diameter is slightly less than the internal diameter of the hemispherical molding cavity. The plurality of upper and lower knock-out pins then are moved inward toward the molding cavity such that the core 2005 or intermediate ball assembly is thus engaged and retained by the plurality of knock-out pins, within the molding cavity. The core or ball assembly is held in the desired position within the molding cavity while one or more molding materials are administered into the cavity and around the core or ball assembly.

Figure 27:
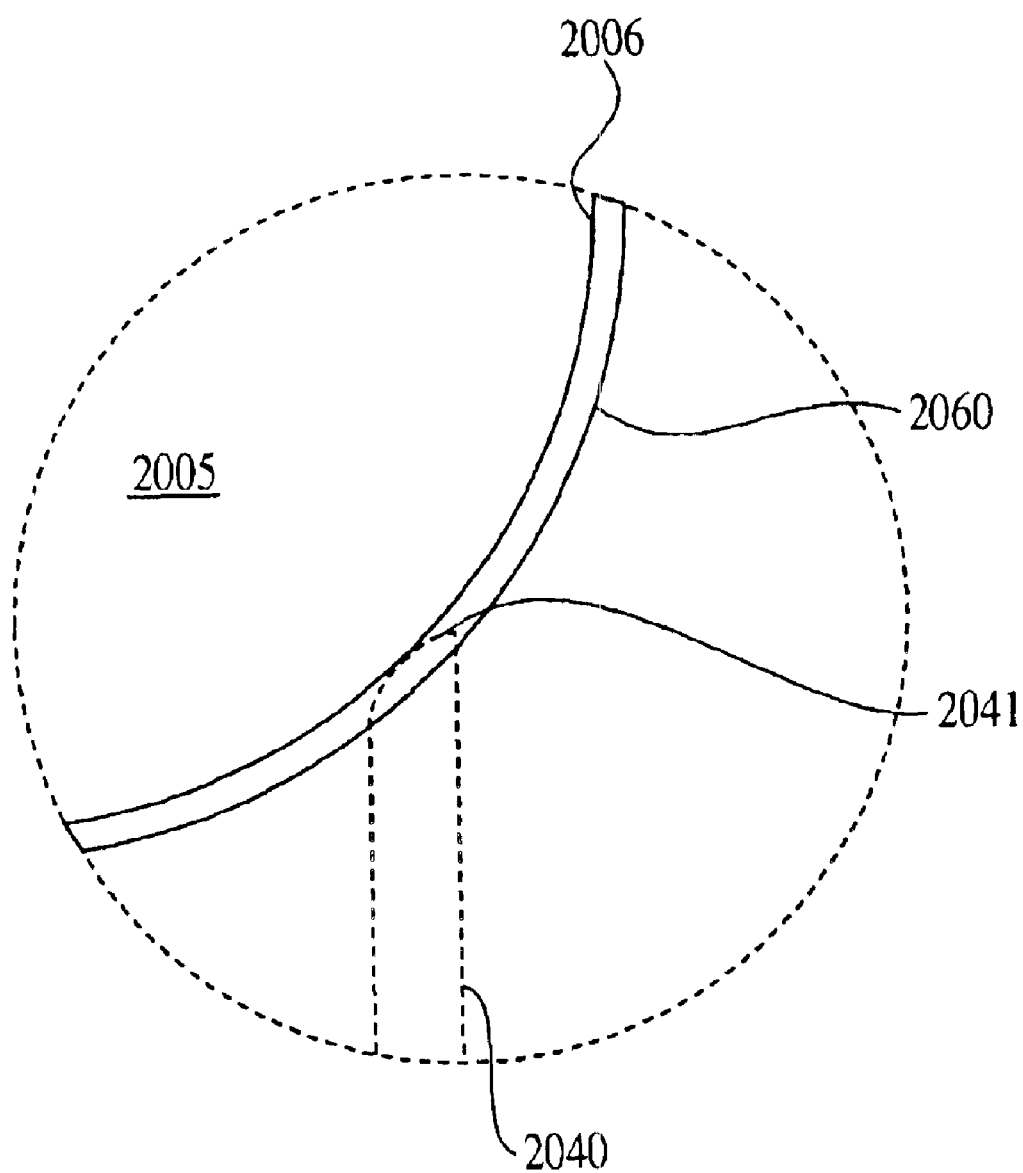
FIG. 27 is a detailed view of the region identified by a circular dashed line in FIG. 26.

FIG. 27 is a detailed view of the region identified by a circular-line in FIG. 26. FIG. 27 illustrates in greater detail the orientation of the core 2005 or intermediate ball assembly within the molding chamber and the engagement of that core or ball assembly by a knock-out pin. Specifically, FIG. 27 illustrates a core 2005 disposed within the molding cavity and positioned very closely near the surface 2060 of the bottom or lower molding component 2020. The outer surface 2006 of the core 2005 is adjacent the inner molding surface 2060. The core 2005 is retained in this particular orientation by engagement of the knock-out pin 2040, and specifically, contact by a distal end 2041 of the knock-out pin 2040. While held in this position, one or more cover layers are molded about the core 2005 and specifically, within the region or void between the outer surface 2006 of the core and the inner molding surface 2060. After molding, the knock-out pins are moved to disengage the core or ball assembly, along with one or more layers molded thereon, from the molding cavity.

The molding apparatus illustrated in FIGS. 25–27 may be utilized in a manner so that one or more, or all of, the knock-out pins, i.e. pins 2030, 2032, 2034, 2036, 2040, 2042, 2044, and 2046 are selectively positioned relative to a core or ball assembly within the molding chamber so as to form one or more deep dimples in the resulting golf ball. For example, one or more of these knock-out pins are positioned such that their distal ends are extended into the molding chamber and contact a core or ball assembly retained within the chamber. A suitable molding material is then administered into the chamber, and specifically within the void between the outer surface of the core or ball and the interior surface of the molding chamber. The knock-out pins used to form one or more deep dimples are not retracted until the molding material has sufficiently cured or hardened so that upon removal or retraction of the pin, the resulting space or recessed region remains and is not filled in from molding material flowing therein.

Figure 28:
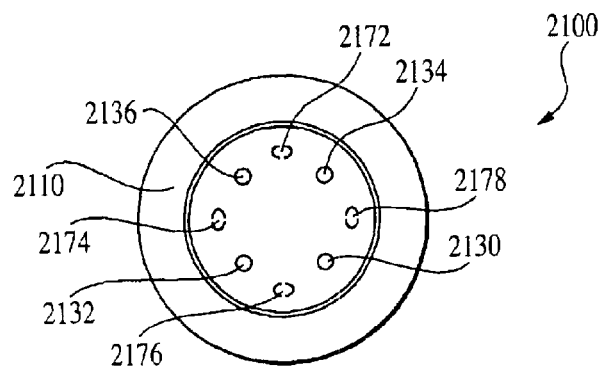
FIG. 28 is a schematic top view of another preferred embodiment molding apparatus according to the present invention.
Figure 29:
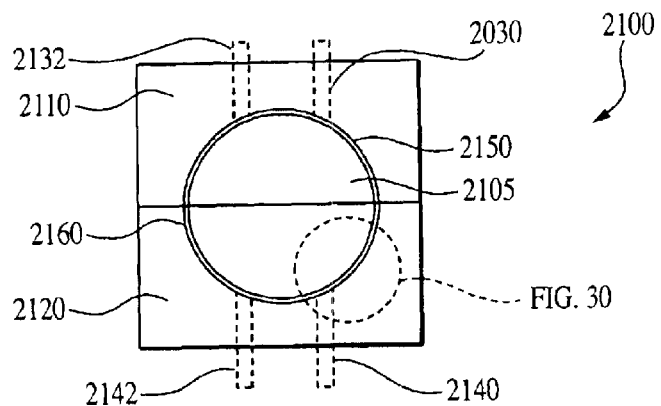
FIG. 29 is a schematic side view of the preferred embodiment molding apparatus shown in FIG. 28.

FIG. 28 is a schematic top view of another preferred embodiment molding apparatus 2100 according to the present invention. FIG. 29 is a schematic side view of the preferred embodiment molding apparatus 2100 shown in FIG. 28. The preferred embodiment molding apparatus 2100 comprises an upper molding component 2110 and a lower molding component 2120. The upper molding component 2110 defines a hemispherical molding surface 2150. The lower molding component 2120 defines a hemispherical molding surface 2160. Each of the upper and lower molding components define a plurality of apertures or guide channels that retain one or more movable knock-out pins as follows. The upper molding component 2110 preferably includes a plurality of knock-out pins 2130, 2132, 2134, and 2136. The lower molding component 2120 includes a plurality of knock-out pins 2140, 2142, and others (not shown). The preferred embodiment molding apparatus 2100 further includes one or more dimples defined in either or both of the upper and lower molding surfaces 2150 and 2160. Specifically, the upper molding surface 2150 preferably includes a plurality of deep dimples such as 2172, 2174, 2176, and 2178. Actually, as will be understood, the dimples provided on a molding surface are actually in the form of a raised projection or protuberance. The bottom or lower molding component 2120 preferably also provides a plurality of deep dimples defined along the lower molding surface 2160. A core 2105 or intermediate ball assembly is placed within the spherical molding cavity created by the upper and lower hemispherical molding surfaces 2150 and 2160.

Figure 30:
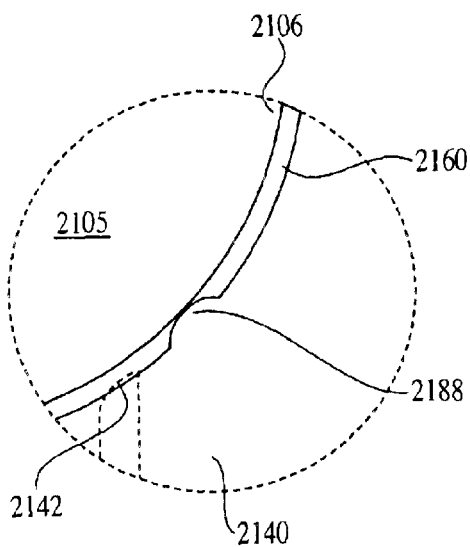
FIG. 30 is a detailed view of the region identified by a circular dashed line in FIG. 29.

FIG. 30 is a detailed view of the region identified by a circular-line in FIG. 29. FIG. 30 further illustrates in greater detail the orientation of the golf ball core 2150 when positioned within the molding cavity and adjacent the lower molding surface 2160. It can be seen that a raised or outwardly extending protuberance 2188 that forms a deep dimple, is defined along the molding surface 2160. And, a knock-out pin 2140 is shown in a retracted position in which the distal end 2142 of the knock-out pin 2140 is not in contact with the core 2105 or ball assembly. This configuration utilizing a combination of movable knock-out pins and protuberances (that form deep dimples) along the interior molding surfaces may be desirable for certain molding operations. For instance, in the event that one or more layers are to be molded or otherwise formed about a core or ball assembly, the positionable knock-out pins may be used to retain the ball within the molding cavity and in conjunction with the raised protuberances to further secure the ball in a desired position. After molding, the knock-out pins are moved to disengage the core or ball assembly, along with one or more layers molded thereon, from the molding cavity. Additionally, as described in conjunction with FIGS. 25–28, one or more of the knock-out pins can be used to also form deep dimples.

The previously described knock-out pins when fully extended into the molding chamber, preferably extend a distance of from about 0.02 inches to about 0.140 inches as measured from the corresponding and adjacent molding surface. The pins preferably extend a distance corresponding to the desired depth of the deep dimples to be formed in the resulting ball.

The knock-out pins described herein are selectively positionable throughout a molding cycle. Accordingly, the pins may be extended or retracted to any extent or degree before, during, or after a molding operation. For certain applications, it may be desirable to position the pins such that they are partially extended into the molding chamber during a molding operation so as to form deep dimples in a golf ball. After molding, instead of retracting the pins, the pins may be extended to displace the molded ball from the molding chamber. Preferably, the pins are ultimately retracted or otherwise removed from the resulting molded ball.

The preferred embodiment knock-out pins may also serve to vent the molding chamber. Accordingly, the preferred embodiment knock-out pins may serve one or more of the following functions: (i) supporting a core or intermediate ball assembly during molding, (ii) venting the mold, and (iii) displacing or extracting the molded ball from the molding chamber.

The support function of the preferred embodiment knock-out pins is performed by the pins retaining the core in the center of the molding chamber until the pressure from the injected molding material supports the core in a balanced manner so that the core is maintained in the center of the chamber. The knock-out pins may then be retracted so that they are flush with the molding surface. The tip or distal end of each pin is preferably shaped like a deep dimple. The knock-out pins must hold the core tightly so that the core does not move during molding. The preferred locations for the knock-out pins are as previously described with regard to the raised protuberances.

Generally, since molding material typically enters the molding chamber through an array of parting line gates arranged on the ball's equators, and moves toward the top and bottom poles of the ball, air or other gases may be trapped between the material flow front and the poles. As noted, an additional function of the knock-out pins is to provide venting of the gases otherwise trapped in the molding chamber. Venting is accomplished by small gaps between the pins and apertures in the mold, within which the pins reside. Typical gaps or dimensions, i.e. the difference between the pin diameter and the aperture diameter, range from about 0.003 inches to about 0.001 inches.

As noted, another function of the knock-out pins is to displace or otherwise move the molded ball out of the molding chamber. This is accomplished by extending the pins into their respective mold after the molding material has sufficiently solidified.

After molding, the golf balls produced may undergo various further processing steps such as buffing, trimming, milling, tumbling, painting and marking as disclosed in U.S. Pat. No. 4,911,451, herein incorporated by reference.

The resulting golf ball is produced more efficiently and less expensively than balls of the prior art. Additionally, the golf balls of the present invention may have multiple cover layers, some of them very thin (less than 0.03 inches, more preferably less than 0.02 inches, even more preferably less than 0.01 inches) if desired, to produce golf balls having specific performance characteristics. For example, golf balls having softer outer cover layer(s) and harder inner cover layer(s) may be produced. Alternatively, golf balls having harder outer cover layer(s) and softer inner cover layer(s) may be produced. Moreover, golf balls having inner and outer cover layers with similar hardnesses are also anticipated by the present invention.

For golf balls having three or more layers, the hardness of the layers may be varied alternately, such as hard-soft-hard, or soft-hard-soft, and the like, or golf balls with a cover having a hardness gradient may be produced. The hardness gradient may start with hard inner layers closest to the core and get softer at the outer layer, or vice versa. This allows a lot of flexibility and control of finished golf ball properties. As previously described, the layers may be of the same or different materials, and of the same or different thicknesses.

In regards to forming a variety of golf balls, the present invention also provides processes for forming a golf ball having at least one deep dimple that is formed in one or more cover layers that are formed by a RIM technique. Preferably, these processes are carried out in conjunction with other features and aspects of the present invention. For example, this process is as follows. An intermediate golf ball assembly such as including a core or a core and/or one or more intermediate layers disposed thereon, is provided. A molding apparatus is also provided for molding an outer cover layer about the intermediate golf ball assembly. The molding apparatus includes a generally spherical molding chamber having a first population or collection of raised regions defined along a molding surface for forming a plurality of dimples on the outer layer of the golf ball. The molding chamber also includes at least one other raised region or collection of raised regions all of which have a height that is greater than the thickness of the outer layer to be formed on the golf ball. The process also includes a step of positioning the intermediate golf ball assembly in the molding chamber and administering a flowable material such as a flowable cover layer material to the molding apparatus. Most preferably, this material is introduced via multiple components which react during the molding operation to form the desired cover material. The material, or rather its components, is introduced such that it flows around the intermediate golf ball assembly disposed in the molding chamber. Preferably, the process includes a step of also hardening the flowable material to thereby form the outer layer. A key feature of this technique is that upon positioning the intermediate golf ball assembly in the molding chamber, the other raised region(s) of the molding chamber contacts and preferably supports the intermediate golf ball assembly while positioned within the molding chamber.

Specifically, the golf ball of the present invention is not particularly limited with respect to its structure and construction. By using well known ball materials and conventional manufacturing processes, the balls may be manufactured as solid golf balls including one-piece golf balls, two-piece golf balls, and multi-piece golf balls with three or more layers and wound golf balls.

The present invention is further illustrated by the following examples in which the parts of the specific ingredients are by weight. It is to be understood that the present invention is not limited to the examples, and various changes and modifications may be made in the invention without departing from the spirit and scope thereof.

EXAMPLES

Golf balls according to the present invention were produced. The golf balls had a core, a mantle or inner cover layer, and an outer cover layer. The mantle was an ionomer, and the outer cover was a polyurethane cover formed by a RIM process (Ball Type A). The mold used had 6 support pins, 3 in each mold half, which formed deep dimples in each hemisphere, located in a triangular arrangement similar to that shown in FIG. 9. The balls were tested against other balls, as described below. The results are shown in Tables 3 to 5 below.

Ball Type B was a ball having a dual core, an ionomer mantle and an injection molded polyurethane cover. Ball Type C was a ball having a single core, an ionomer mantle and an ionomer cover. Ball Type D was a commercial grade Strata® Tour Professional™ ball, Ball Type E was a commercial grade Top-Flite® Z-Balata™ 90 golf ball, Ball Type F was a commercial grade Nike® Tour Accuracy TW™ ball, and Ball Type G was a commercial grade Titleist® Pro V1™ ball.

Coefficient of restitution (C.O.R.) was measured by firing the resulting golf ball in an air cannon at a velocity of 125 feet per second against a steel plate positioned 12 feet from the muzzle of the cannon. The rebound velocity was then measured. The rebound velocity was divided by the forward velocity to give the coefficient of restitution. Shore hardness was determined in general accordance with ASTM Test 2240, but was measured on a non-dimpled area of the surface of the golf ball as previously described.

The scuff resistance test was conducted in the manner described below. The balls that were tested were primed and top coated. A sharp grooved sand wedge (56 degrees loft) was mounted in a mechanical swing machine. The club swing speed used was 60 mph. After each hit, the club face was brushed clean using a nylon bristled brush. A minimum of three samples of each ball was tested. Each ball was hit three times at three different locations so as not to overlap with other strikes. The details of the club face are critical, and are as follows:

Groove width—0.025 inches (cut with a mill cutter, leaving a sharp edge to the groove; no sandblasting or post finishing should be done after milling);

Groove depth—0.016 inches;

Groove spacing (one groove edge to the nearest adjacent edge)—0.105 inches.

For each strike, a point value should be assigned for the worst two defects according to the following Table 2:

TABLE 2

| Point Value | Shear Defect |
|---|---|
| 0 | No visible defects |
| 0.5 | Lines |
| 1 | Lifts |
| 2 | Bad Lifts |
| 2 | Tiny (or Paint) Hairs |
| 3 | Bad Hairs |

TABLE 2-continued

| Point Value | Shear Defect |
|---|---|
| 3 | Shears (if land area is removed on "hard" covers (65 Shore D+), rank as the only defect |
| 6 (max value) | Bad Shears (dimples are completely removed, rank as the only defect) |

Example—a strike having a shear, tiny hairs, bad lifts and a line would be ranked as a 5 (3 points for a shear and 2 points for tiny hairs) Note: The maximum value per strike is 6.

After completing all strikes, the average point value was determined. This average point value, or rank, can be correlated to the chart below.

| Rank | Average Point Value |
|---|---|
| Excellent | 0.0–1.0 |
| Very Good | 1.1–2.0 |
| Good | 2.1–3.0 |
| Fair | 3.1–4.0 |
| Borderline | 4.1–5.0 |
| Poor (unacceptable) | 5.1–6.0 |

Cut resistance was measured by utilizing a guillotine cutting device.

The cut resistance of the balls tested herein was evaluated on a scale of 1 to 5. The number 1 represents a cut that extends completely through the cover to the core. A 2 represents a cut that does not extend completely through the cover but that does break the surface. A 3 does not break the surface of the cover but does leave a permanent dent. A 4 leaves only a slight crease which is permanent but not as severe as 3. A 5 represents virtually no visible indentation or damage of any sort.

Cut and scuff testing was conducted on the golf balls of the invention (Ball Type A), two experimental golf balls (Ball Types B and C), and two commercial grade golf balls (Ball Types F and G).

Initial velocity is the velocity of a ball when struck at a hammer speed of 143.8 feet per second in accordance with a test as prescribed by the U.S.G.A.

As used herein, "Shore D hardness" or "Shore C hardness" of a core or cover component is measured generally in accordance with ASTM D-2240, except the measurements are made on the curved surface of the molded component, rather than on a plaque. Furthermore, the Shore C and D hardness of the cover is measured while the cover remains over the core. When a hardness measurement is made on a dimpled cover, Shore C or Shore D hardness is measured at a land area of the dimpled cover.

Spin rate testing was conducted with the finished multi-layer golf balls (Ball Type A) of the invention, as well as two other experimental multi-layer cover golf balls (Ball Types B and C) using a driver, a 5 iron, a 9 iron, and a pitching wedge.

For comparative purposes, two commercial grade golf balls (Ball Types D and E) were also tested. The golf ball testing machine was set up to emulate the launch conditions of an average touring professional golfer for each particular club.

TABLE 3

Ball Construction and Test Results

| Ball Type | Size (inches) | Weight (grams) | Riehle Comp. | Comp. (PGA) | COR | Nez Factor | Cut Rank | Scuff |
|---|---|---|---|---|---|---|---|---|
| A | 1.683 | 45.5 | 80 | 80 | 0.801 | 881 | 3 | 4* |
| B | 1.684 | 45.5 | 81 | 79 | 0.808 | 889 | 3 | 6 |
| C | 1.685 | 45.4 | 79 | 81 | 0.808 | 887 | 3 | 5.8 |
| D | 1.684 | 45.4 | 80 | 80 | 0.800 | 880 | — | — |
| E | — | — | — | — | — | — | 5 | 6 |
| F | — | — | — | — | — | — | 2 | 2.7* |

*Defects were due to peeling of paint layers, not cover materials
Note that Ball Type A had cut and scuffs results as good as, if not better than, most of the other ball types.

Below are the results of the spin rate and distance testing:

TABLE 4

Spin Rate Data (average for 12 hits per ball type)

| Club | Ball Type | Launch Angle | Total Spin Rate (rpm) | Ball Velocity (ft./sec.) |
|---|---|---|---|---|
| Hogan Prototype Driver | A | 10.3 | 2442 | 235.0 |
| | B | 10.1 | 2776 | 236.0 |
| | C | 10.1 | 2776 | 236.5 |
| | D (Strata ® Tour Professional) | 10.0 | 2660 | 235.4 |
| | E (Z-Balata 90) | 10.0 | 2928 | 230.8 |

TABLE 5

Distance Data (average for 12 hits per ball type)

| Club | Ball Type | Trajectory | Peak Time (sec) | Flight Time (sec) | Carry (yards) | Roll (yards) | Total Distance (yards) |
|---|---|---|---|---|---|---|---|
| Hogan Prototype Driver | A | 29.9 | 1.91 | 6.61 | 254.1 | 6.4 | 260.2 |
| | B | 30.4 | 1.99 | 6.84 | 258.8 | 5.3 | 264.0 |
| | C | 31.3 | 2.04 | 6.91 | 257.2 | 3.4 | 260.3 |
| | D | 29.4 | 1.85 | 6.49 | 252.1 | 5.8 | 257.9 |
| Top Flite Tour ™ 5 Iron | A | 46.6 | 1.93 | 6.47 | 176.1 | 3.1 | 179.2 |
| | B | 47.1 | 2.04 | 6.45 | 173.5 | 2.3 | 175.7 |
| | C | 47.4 | 2.08 | 6.51 | 173.5 | 1.6 | 175.1 |
| | D | 45.6 | 1.96 | 6.49 | 177.1 | 2.4 | 179.5 |

Note that Ball Type A had results comparable to the other ball types.

The foregoing description is, at present, considered to be the preferred embodiments of the present invention. However, it is contemplated that various changes and modifications apparent to those skilled in the art may be made without departing from the present invention. Furthermore, it will be understood that any of the details, features, aspects or characteristics of a preferred embodiment, may be combined with any other detail, feature, aspect, or characteristic of another embodiment. Therefore, the foregoing description is intended to cover all such changes and modifications encompassed within the spirit and scope of the present invention, including all equivalent aspects.

We claim:

1. A molding apparatus adapted for forming a golf ball having one or more deep dimples that extend at least to the next layer, said apparatus comprising:

an upper mold having a first hemispherical molding surface that defines (i) a hemispherical molding cavity, and (ii) at least one aperture defined along said first molding surface, said upper mold further having in each of said apertures, a selectively positionable pin having a distal end that may be extended into said cavity or retracted from said cavity, wherein said first hemispherical molding surface further defines at least one outwardly extending projection having a height as measured from said first molding surface, to from about 0.002 inches to about 0.140 inches;

a lower mold having a second hemispherical molding surface that defines (i) a hemispherical molding cavity, and (ii) at least one aperture defined along said second molding surface, said lower mold further having in each of said apertures, a selectively positionable pin having a distal end that may be extended into said cavity or retracted from said cavity, wherein said second hemispherical molding surface further defines at least one outwardly extending projection having a height as measured from said second molding surface, of from about 0.002 inches to about 0.140 inches, wherein said upper mold and said lower mold are adapted to engage each other such that said first molding surface and said second molding surface form a generally spherical molding chamber;

whereby said pins in said apertures defined in said upper mold and said lower mold extend into said molding chamber a distance of from about 0.002 inches to about 0.140 inches as measured from said respective first and second molding surface, said pins remaining in said extended position during a molding operation so as to form a corresponding number of deep dimples in said golf ball.

2. The molding apparatus of claim 1, wherein said distance is from about 0.002 inches to about 0.050 inches.

3. The molding apparatus of claim 1, wherein said pins have a diameter of from about 0.025 inches to about 0.250 inches.

4. The molding apparatus of claim 1, wherein said upper mold and said lower mold each include from 1 to 10 pins.

5. A molding apparatus adapted for forming a golf ball with a plurality of deep dimples along an outer surface of said golf ball that extend at least to the next layer, said apparatus comprising:

a first mold including a first hemispherical molding surface defining a first molding cavity and at least one aperture defined along said first molding surface, said first molding surface having at least one raised protuberance adapted to form a deep dimple, said first mold further including in each of said at least one apertures, a selectively positionable pin having a distal end that may be extended into said first cavity or retracted from said first cavity;

a second mold including a second hemispherical molding surface defining a second molding cavity and at least one aperture defined along said second molding surface, said second molding surface having at least one raised protuberance adapted to form deep dimple, said second mold further including in each of said at least one apertures, a selectively positionable pin having a distal end that may be extended into said second cavity or retract from said second cavity;

wherein said first mold and said second mold are adapted to engage each other such that said first molding surface and said second molding surface form a generally spherical molding chamber;

whereby at least a portion of said raised protuberances in said first and second molding surfaces have a height as measured from said respective molding surface, of from about 0.002 inches to about 0.140 inches.

6. The molding apparatus of claim 5, wherein said pins in said apertures defined in said first and said second molds extend into said molding chamber a distance of from about 0.002 inches to about 0.140 inches as measured from said respective first and second molding surface.

7. A molding apparatus adapted for forming a golf ball having one or more deep dimples that extend at least to the next layer, said apparatus comprising:

an upper mold having a first hemispherical molding surface that defines (i) a hemispherical molding cavity, and (ii) at least one aperture defined along said first molding surface, said upper mold further having in each of said apertures, a selectively positionable pin having a distal end that may be extended into said cavity or retracted from said cavity, wherein said first hemispherical molding surface further defines at least one outwardly extending projection having a height as measured from said first molding surface, of from about 0.002 inches to about 0.140 inches;

a lower mold having a second hemispherical molding surface that defines (i) a hemispherical molding cavity, and (ii) at least one aperture defined along said second molding surface, said lower mold further having in each of said apertures, a selectively positionable pin having a distal end that may be extended into said cavity or retracted from said cavity, wherein said upper mold and said lower mold are adapted to engage each other such that said first molding surface and said second molding surface form a generally spherical molding chamber;

whereby said pins in said apertures defined in said upper mold and said lower mold extend into said molding chamber a distance of from about 0.002 inches to about 0.140 inches as measured from said respective first and second molding surface, said pins remaining in said extended position during a molding operation so as to form a correspond number of deep dimples in said golf ball.

8. The molding apparatus of claim 7, wherein said distance is from about 0.002 inches to about 0.050 inches.

9. The molding apparatus of claim 7, wherein said pins have a diameter of from about 0.025 inches to about 0.250 inches.

10. The molding apparatus of claim 7, wherein said upper mold and said lower mold each include from 1 to 10 pins.

11. The molding apparatus of claim 7, wherein said second hemispherical molding surface further defines at least one outwardly extending projection having a height as measured from said second molding surface, of from about 0.002 inches to about 0.140 inches.

12. A molding apparatus adapted for forming a golf ball having one or more deep dimples that extend at least to next layer, said apparatus comprising:

an upper mold having a first hemispherical molding surface that defines (i) a hemispherical molding cavity, and (ii) at least one aperture defined along said first molding surface, said upper mold further having in each of said apertures, a selectively positionable pin having a distal end that may be extended into said cavity or retracted from said cavity;

a lower mold having a second hemispherical molding surface that defines (i) a hemispherical molding cavity, and (ii) at least one aperture defined along said second molding surface, said lower mold further having in each of said apertures, a selectively positionable pin having a distal end that may be extended into said cavity or retracted from said cavity, wherein said second hemispherical molding surface further defines at least one outwardly extending projection having a height as measured from said second molding surface, of from about 0.002 inches to about 0.140 inches, wherein said upper mold and said lower mold are adapted to engage each other such that said first molding surface and said second molding surface form a generally spherical molding chamber;

whereby said pins in said apertures defined in said upper mold and said lower mold extend into said molding chamber a distance of from about 0.002 inches to about 0.140 inches as measured from said respective first and second molding surface, said pins remaining in said extended position during a molding operation so as to form a corresponding number of deep dimples in said golf ball.

13. The molding apparatus of claim 12, wherein said distance is from about 0.002 inches to about 0.050 inches.

14. The molding apparatus of claim 12, wherein said pins have a diameter of from about 0.025 inches to about 0.250 inches.

15. The molding apparatus of claim 12, wherein said upper mold said lower mold each include from 1 to 10 pins.

16. The molding apparatus of claim 12, wherein said first hemispherical molding surface further defines at least one outwardly extending projection having a height as measured from said first molding surface, of from about 0.002 inches to about 0.140 inches.

* * * * *